(12) United States Patent
Ueda et al.

(10) Patent No.: US 7,746,738 B2
(45) Date of Patent: Jun. 29, 2010

(54) DATA PROCESSING METHOD, INFORMATION RECORDING MEDIUM MANUFACTURING MANAGEMENT SYSTEM, RECORDING DATA GENERATION APPARATUS AND METHOD, AND COMPUTER PROGRAM

(75) Inventors: Kenjiro Ueda, Kanagawa (JP); Tateo Oishi, Saitama (JP); Yoshitomo Osawa, Kanagawa (JP); Katsumi Muramatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 400 days.

(21) Appl. No.: 11/574,652

(22) PCT Filed: Aug. 30, 2005

(86) PCT No.: PCT/JP2005/015813
§ 371 (c)(1),
(2), (4) Date: Jul. 5, 2007

(87) PCT Pub. No.: WO2006/025415
PCT Pub. Date: Mar. 9, 2006

(65) Prior Publication Data
US 2007/0247985 A1    Oct. 25, 2007

(30) Foreign Application Priority Data
Sep. 2, 2004    (JP)    ............ P2004-255154

(51) Int. Cl.
*G11B 7/00* (2006.01)

(52) U.S. Cl. ............... 369/47.12; 369/53.21; 369/59.1; 369/275.1

(58) Field of Classification Search .............. None
See application file for complete search history.

(56) References Cited

U.S. PATENT DOCUMENTS

2002/0196729 A1* 12/2002 Fairman et al. .......... 369/275.4

FOREIGN PATENT DOCUMENTS

JP    2002-258011    12/2002

* cited by examiner

Primary Examiner—Muhammad N. Edun
(74) Attorney, Agent, or Firm—K&L Gates LLP

(57) ABSTRACT

In a process for manufacturing an information recording medium, a configuration is provided in which strict information management and an information recording medium manufacturing process are realized. In a configuration in which master data as original data of recording data for an information recording medium is generated and recording data for the information recording medium is generated on the basis of the master data, master data containing a dummy data area in a partial area of the master data is generated, and the dummy data area is identified and a process for setting significant information is performed on the basis of the stored information of an auxiliary file. Therefore, it is not necessary to obtain data of significant information when the master data is to be generated, and it becomes possible to generate the master data without obtaining specific information, such as an encrypted key block.

9 Claims, 32 Drawing Sheets

FIG. 3

| INDEX, SUCH AS TITLE, WHICH CAN BE DISTINGUISHED IN APPLICATION LAYER | CONTENT MANAGEMENT UNIT (CPS) | UNIT KEY (CPS) |
|---|---|---|
| TITLE 1 | CPS1 | Ku1 |
| TITLE 2 | CPS1 | Ku1 |
| APPLICATION 1 | CPS2 | Ku2 |
| APPLICATION 2 | CPS3 | Ku3 |
| . . | . . | . . |
| DATA GROUP 1 | CPS4 | Ku4 |
| DATA GROUP 2 | CPS5 | Ku5 |
| . . | . . | . . |

FIG. 12

(A)
```
HASH TABLE for Clip(n)( ){                                    #bytes
    NH: NUMBER OF ALL HASH UNITS in Clip(n)                     4
    NUMBER OF CPS UNIT TO WHICH Clip(n) BELONGS                 2
    for (i = 0; i<NH; i++ ){
        Hash Value(i)                                           8
    }
}
```

(B)
```
ASSOCIATED TABLE ( ){                                         #bytes
    NC: NUMBER OF ALL CLIP FILES                                2
    NH: NUMBER OF ALL HASH UNITS                                4
    for (i = 0; i<NC; i++) {
        START HASH UNIT NUMBER OF Clip(i)                       4
        NUMBER ATTACHED TO FILE NAME OF Clip(i)                 4
    }
}
```

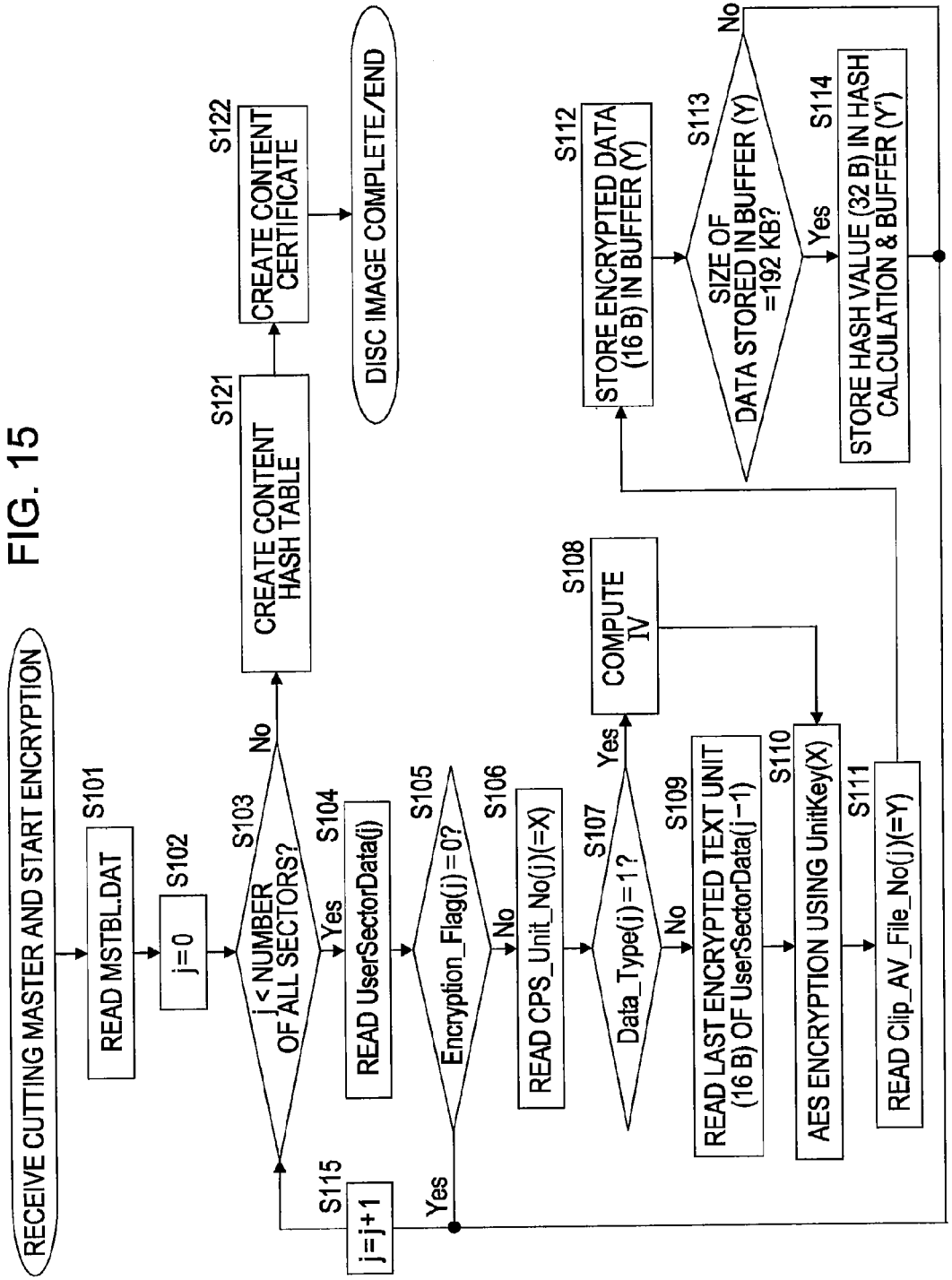

FIG. 16

| | #bits | value |
|---|---|---|
| Li_MSTBL_DAT( ){ | | |
| UD_START_Location | 32 | |
| UD_END_Location | 32 | |
| CHT_Location | 32 | |
| CHT_Offset | 32 | |
| Content_Cert_Location | 32 | |
| Content_Cert_Offset | 32 | |
| UK_Inf_Location | 32 | |
| UK_Inf_Offset | 32 | |
| Num_of_UK | 32 | |
| MFK_Cert_Location | 32 | |
| MKB_Location | 32 | |
| For ( j = 1; j =<N, j++ ) { | | |
| Encryption_Flag(j) | 8 | $00_{16}$ : not to-be-encrypted<br>$01_{16}$ : to-be-encrypted |
| Data_Type(j) | 8 | $01_{16}$ : 1st sector of AU<br>$02_{16}$ : 2nd sector of AU<br>$03_{16}$ : 3rd sector of AU |
| CPS_Unit_No(j) | 16 | $0000_{16}$-$FFFF_{16}$ |
| Clip_AV_File_No(j) | 24 | 00000-99999 |
| Reserved | 6 | $000000_2$ |
| Last_Sector_of_Clip(j) | 1 | $0_2$ : not Last Sector of each Clip in layer i<br>$1_2$ : Last Sector of each Clip |
| Last_Sector_of_Layer(j) | 1 | $0_2$ : not Last Sector of each Clip in layer i<br>$1_2$ : Last Sector of each Clip in each layer i |
| } | | |
| } | | |

FIG. 17

UD_START_Location: PHYSICAL SECTOR NUMBER AT START POINT OF User Data (Data Zone) OF EACH LAYER.
UD_END_Location: PHYSICAL SECTOR NUMBER AT END POINT OF User Data (Data Zone) OF EACH LAYER.
CHT_Location: PHYSICAL SECTOR NUMBER AT START POINT OF CHT.
CHT_Offset: NUMBER OF BYTES FROM START POINT OF CHT AND IMMEDIATELY UP TO A POINT JUST BEFORE HASH VALUE (DATA EMBEDDED BY MASTERING FACILITY).
Content_Cert_Location: PHYSICAL SECTOR NUMBER AT START POINT OF CONTENT CERTIFICATE.
Content_Cert_Offset: NUMBER OF BYTES FROM START POINT OF CONTENT CERTIFICATE AND IMMEDIATELY UP TO A POINT JUST BEFORE CONTENT ID (DATA EMBEDDED BY MASTERING FACILITY).
UK_Inf_Location: PHYSICAL SECTOR NUMBER AT START POINT OF Unit_Key.inf (SEE P.2). WHEN Unit_Key.inf IS NOT RECORDED IN THE LAYER, $00000000_{16}$ IS WRITTEN.
UK_Inf_Offset: NUMBER OF BYTES FROM START POINT OF Unit_Key.inf AND IMMEDIATELY UP TO A POINT JUST BEFORE ENCRYPTED UNIT KEY FOR CPS UNIT #1. WHEN Unit_Key.inf IS NOT RECORDED IN THE LAYER, $00000000_{16}$ IS WRITTEN.
Num_of_UK: NUMBER OF UNIT KEYS OF THE ENTIRE DISC (=NUMBER OF CPS UNITS).
MFK_Cert_Location: PHYSICAL SECTOR NUMBER AT START POINT OF MF KEY CERTIFICATE. SIZE IS FIXED. WHEN MFK_Cert IS NOT RECORDED IN THE KEY, $00000000_{16}$ IS WRITTEN.
MKB_Location: PHYSICAL SECTOR NUMBER AT START POINT OF MKB. WHEN MKB_Cert IS NOT RECORDED IN THE KEY, $00000000_{16}$ IS WRITTEN.
N: NUMBER OF LOGICAL SECTORS OF LAYER i.
Encryption_Flag: FLAG INDICATING WHETHER OR NOT ENCRYPTION SHOULD BE PERFORMED.
Data_Type: FLAG INDICATING TYPE OF SECTOR.
CPS_Unit_No: CPS UNIT NUMBER.
Clip_AV_File_No: CLIP FILE NUMBER. INFORMATION USED FOR GENERATING CHT.
Last_Sector_of_Clip: FLAG INDICATING LAST SECTOR OF EACH CLIP (IRRESPECTIVE OF LAYER).
Last_Sector_of_Layer: FLAG INDICATING LAST SECTOR IN EACH LAYER.

| | #bits | value |
|---|---|---|
| Li_MSTBL.DAT(){ | | |
| UD_START_Location | 32 | |
| UD_END_Location | 32 | |
| | | |
| MFK_Cert_Location | 32 | |
| MKB_Location | 32 | |
| For ( j = 1; j =<N, j++ ) { | | |
| Encryption_Flag(j) | 8 | $00_{16}$ : not to-be-encrypted |
| | | $01_{16}$ : to-be-encrypted |
| Data_Type(j) | 8 | $01_{16}$ : 1st sector of AU |
| | | $02_{16}$ : 2nd sector of AU |
| | | $03_{16}$ : 3rd sector of AU |

951

(B)

MKB_Location: PHYSICAL SECTOR NUMBER AT START POINT OF MKB. WHEN MKB_Cert IS NOT RECORDED IN THE LAYER, $00000000_{16}$ IS WRITTEN.

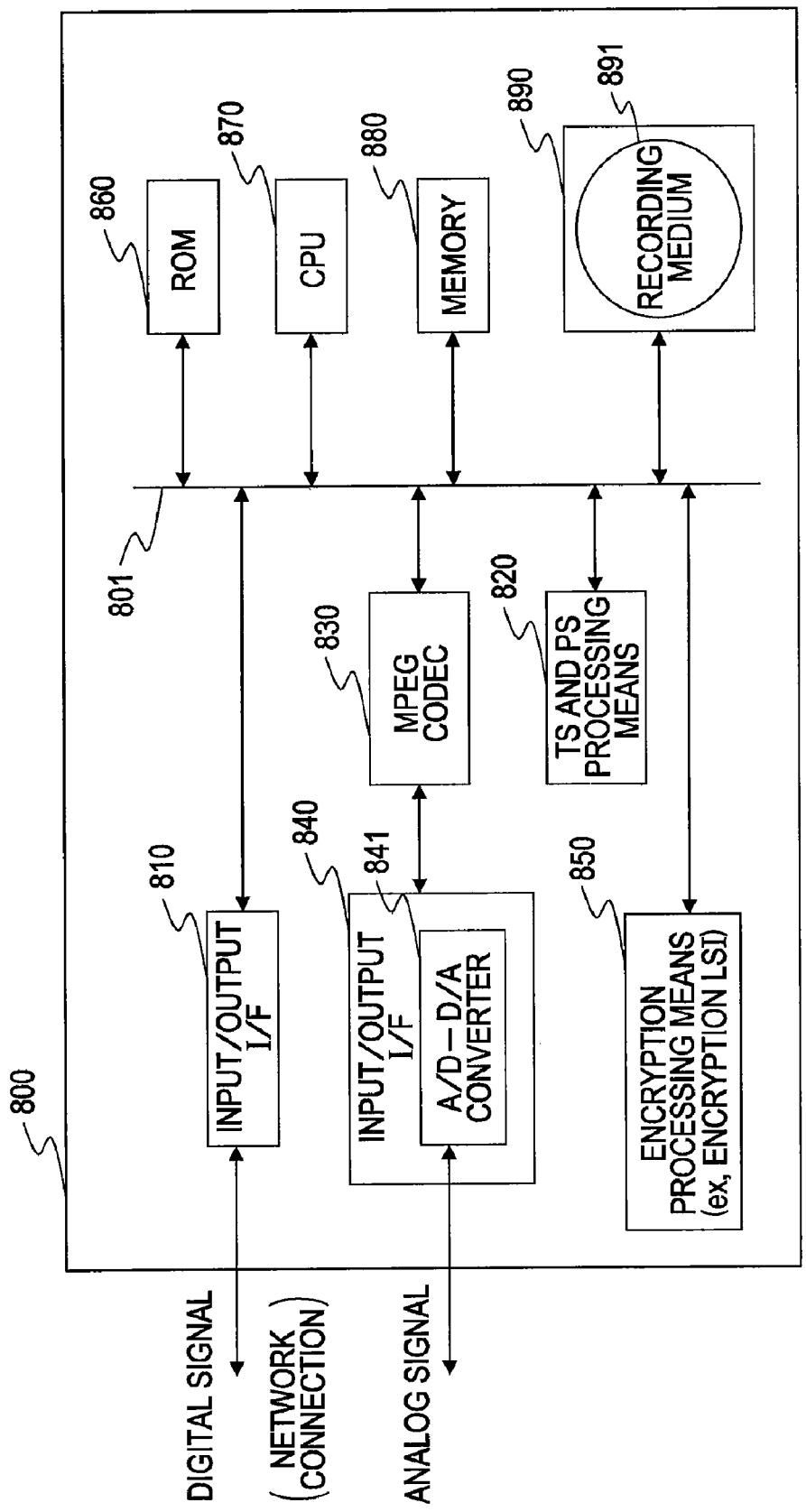

DATA PROCESSING METHOD, INFORMATION RECORDING MEDIUM MANUFACTURING MANAGEMENT SYSTEM, RECORDING DATA GENERATION APPARATUS AND METHOD, AND COMPUTER PROGRAM

CROSS REFERENCES TO RELATED APPLICATIONS

The present application claims priority to Japanese Patent Application JP 2004-255154, filed in the Japanese Patent Office on Sep. 2, 2004, the entire contents of which being incorporated herein by reference.

BACKGROUND

The present application relates to a data processing method, an information recording medium manufacturing management system, a recording data generation apparatus and method, and a computer program. More particularly, the present invention relates to a data processing method capable of efficiently generating recording data for an information recording medium, an information recording medium manufacturing management system for use therewith, a recording data generation apparatus and method for use therewith, and a computer program for use therewith.

Various software data, such as audio data such as music, image data such as movies, game programs, and various kinds of application programs (hereinafter, these will be referred to as "content"), can be stored as digital data on a recording medium, for example, a Blu-ray disc in which a blue laser is used, a DVD (Digital Versatile Disc), an MD (Mini Disc), and a CD (Compact Disc). In particular, a Blu-ray disc using a blue laser is a disc capable of high-density recording and is capable of recording a large amount of video content or the like as high-quality data.

Digital content is stored in these various information recording media and is provided to a user. The user reproduces and uses content in an owned reproduction device, such as a PC (Personal Computer) or a disc player.

In general, sales rights or the like of most content, such as music data and image data, are held by the creator thereof or the seller thereof. Therefore, when distributing these pieces of content, it is common practice that a fixed use limitation is imposed, that is, use of content is permitted for an authorized user so that copying without permission or the like will not be performed.

According to a digital recording apparatus and a recording medium, images and audio can be repeatedly recorded and reproduced without degrading them. Therefore, problems such as those described below have occurred: the distribution of illegally copied content via the Internet, the distribution of so-called pirated discs produced using CD-Rs and the like, onto which content has been recorded, and wide use of copied content stored in a hard disk of a PC or the like.

It is possible for a DVD or a large-capacity recording medium, such as a recording medium using a blue laser whose development has progressed in recent years, to record a large amount of data for one to several movies as digital information on one medium. When it has become able to record video information and the like as digital information in the manner described above, it has become increasingly important to prevent illegal copying and protect a copyright holder. In recent years, in order to prevent such illegal copying of digital data, various technologies for preventing illegal copying to digital recording apparatuses and recording media have been implemented.

For example, in a DVD player, a content scramble system is adopted. In the content scramble system, video data, audio data, and the like are encrypted and recorded on a DVD-ROM (Read Only Memory). A key used to decrypt encrypted data is given to a licensed DVD player. The license is given to a DVD player that is designed to comply with predetermined operation definitions such that illegal copying is not performed. Therefore, in the licensed DVD player, by decrypting the encrypted data recorded on a DVD-ROM by using a given key, images and audio can be reproduced from the DVD-ROM.

On the other hand, since a non-licensed DVD player does not have a key for decrypting encrypted data, it is not possible to decrypt encrypted data recorded on a DVD-ROM. As described above, in the content scramble system, a DVD player that does not satisfy conditions required at license time cannot play a DVD-ROM having digital data recorded thereon, so that illegal copying is prevented.

As one technique for eliminating unauthorized use of content, control configuration has been proposed in which presence or absence of tampering of content is verified by an information processing apparatus (reproduction apparatus) for reproducing content, content reproduction is permitted only when it is confirmed that the content has not been tampered with, and the content is not reproduced when it is confirmed that the content has been tampered with.

For example, in Patent Document 1, control configuration has been disclosed in which a hash value is calculated from a content file scheduled to be reproduced, the hash value is compared with a comparison hash value that is prepared in advance, that is, a comparison hash value calculated in advance on the basis of valid content data, when the newly computed hash value matches the comparison hash value, it is determined that there has been no tampering of content, and the process proceeds to a content reproduction process.

However, when a process for computing a hash value on the basis of content in the manner described above is to be performed, when the size of content data as the original data for which a hash value is computed is large, the processing load and processing time required for calculations become enormous. In recent years, as the quality of moving image data has become increasingly higher, the moving image data often has an amount of data of several GB to several tens of GB per content. The fact that a user device for reproducing content is made to perform such a content hash value computation process on the basis of large-size data causes problems to occur, for example, the data processing performance required for the user device becomes enormous, the time required to verify content becomes longer, and the content reproduction process cannot be performed efficiently.

when an information recording medium having content stored thereon is to be manufactured, a content editing entity for editing content, and an information recording medium manufacturing entity for creating a disc image as recording data for an information recording medium on the basis of edited content and for manufacturing a disc on which the recording data is recorded on the basis of a disc image are necessary. Furthermore, a management center for performing content use management and management of information recording medium manufacturing licenses and the like is necessary. Predetermined data is exchanged between these, and content-stored information recording media on which encrypted content, key information, and the like are stored are manufactured on the basis of a valid license.

However, in this manufacturing process, various kinds of data, for example, key data, a content certificate, and the like, which can be generated by only a specific entity, exist. It is necessary to generate these pieces of data efficiently and under strict management, to exchange them among the entities, and to record them.

[Patent Document 1] Japanese Unexamined Patent Application Publication No. 2002-358011

SUMMARY

The present application has been made in view of such circumstances. A data processing method for realizing efficient and strict information management and information recording medium manufacturing processing in processing of manufacturing information recording media having stored thereon various kinds of content for which use management such as copyright management is required, an information recording medium manufacturing management system for use therewith, a recording data generation apparatus and method for use therewith are provided according to an embodiment as described in further detail below.

According to a first aspect, there is provided a data processing method including:

a master data generation step of generating master data as original data of recording data for an information recording medium; and a recording data generation step of generating recording data for the information recording media on the basis of the master data, wherein the master data generation step generates master data containing a dummy data area in a partial area of the master data, and the recording data generation step performs a process for setting significant information for the dummy data area in order to generate recording data.

In an embodiment of the data processing method of the present application, the data processing method further includes a step of creating an auxiliary file containing position information of the dummy data area, wherein the recording data generation step identifies the dummy data area on the basis of the position information of the auxiliary file, and performs a process for setting significant information for the identified information.

According to a second aspect, there is provided an information recording medium manufacturing management system including:

a management center for providing management information for content use management; a content editing entity for performing a content editing process; and an information recording medium manufacturing entity for receiving edited content from the content editing entity and for recording content on an information recording medium, wherein the content editing entity is configured to generate master data as original data of recording data for the information recording medium as master data containing a dummy data area in a partial area of the master data and provide the master data to the information recording medium manufacturing entity, and the information recording medium manufacturing entity is configured to generate recording data for the information recording medium on the basis of the master data containing the dummy data area and perform a process for setting information received from a management center or generated information in the dummy data area in order to generate recording data.

In an embodiment of the information recording medium manufacturing management system of the present application, the content editing entity is configured to create an auxiliary file containing position information of the dummy data area and provide the auxiliary file to the information recording medium manufacturing entity, and the information recording medium manufacturing entity is configured to identify the dummy data area on the basis of the position information of the auxiliary file and perform a process for setting information received from the management center or generated information in the dummy data area.

In an embodiment of the information recording medium manufacturing management system of the present application, the information recording medium manufacturing entity is configured to perform a process for using an encrypted key block structured so that significant information can be obtained by only a device having a valid license as information to be set in the dummy data area.

In an embodiment of the information recording medium manufacturing management system of the present application, the information recording medium manufacturing entity is configured to perform a process for using at least one of a content hash table (CHT) in which hash values based on content to be stored on the information recording medium are stored, a content certificate (Content_Cert) for verifying the authenticity of content, key information used to encrypt content, and a public key certificate (MF Key Certificate) of the information recording medium manufacturing entity as information to be set in the dummy data area.

According to a third aspect, there is provided a recording data generation apparatus for generating format data as recording data for an information recording medium, the recording data generation apparatus including:

an analyzer configured to analyze an auxiliary file containing data recording mode information for master data as original data of recording data for the information recording medium; and a data position setter configured to determine the position at which specific information is set in accordance with analysis information of the analyzer, wherein the analyzer is configured to obtain dummy data setting position information as the setting position information of the specific information contained in the auxiliary file, and the data position setter is configured to determine the position at which the specific information is set in accordance with the obtained information.

In an embodiment of the recording data generation apparatus of the present i application, the recording data generation apparatus further includes an encryptor, wherein the analyzer analyzes the necessity/unnecessity of encryption for each sector and an encryption mode on the basis of the auxiliary file, and the encryptor performs an encryption process in accordance with the analysis information and generates recording data in units of sectors.

According to a fourth aspect, there is provided a recording data generation method for generating format data as recording data for an information recording medium, the recording data generation method including:

an analysis step of analyzing an auxiliary file containing data recording mode information for master data as original data of recording data for the information recording medium and obtaining setting position information of specific information contained in the auxiliary file; and a data position setting step of setting a specific information position in the recording data in accordance with the setting position information of the specific information obtained in the analysis step.

In an embodiment of the recording data generation method of the present application, the recording data generation method further includes an encryption step, wherein the analysis step analyzes the necessity/unnecessity of encryption for each sector and an encryption mode on the basis of the auxiliary file, and the encryption step performs an encryption process in accordance with the analysis information and generates recording data in units of sectors.

According to a fifth aspect, there is provided a computer program for enabling a computer to generate format data as recording data for an information recording medium, the computer program including:

an analysis step of analyzing an auxiliary file containing data recording mode information for master data as original data of recording data for the information recording medium and obtaining setting position information of specific information contained in the auxiliary file; and a data position setting step of setting a specific information position in the recording data in accordance with the setting position information of the specific information obtained in the analysis step.

The computer program is, for example, a computer program that can be provided to a computer system capable of executing various program codes by means of a storage medium or a communication medium for providing the program codes in a computer-readable format, for example, a recording medium such as a CD, an FD, or an MO, or a communication medium such as a network. As a result of providing such a program in a computer-readable format, processing corresponding to the program is realized in the computer system.

Further other objects, features, and advantages of the present application will become apparent from the more detailed description based on the embodiments of the present application as will be described later and the attached drawings. In this specification, the system designates a logical assembly of a plurality of devices. It is not essential that the devices be disposed in the same housing.

ADVANTAGES

According to the configuration of the present application, in a configuration in which master data as original data of recording data for an information recording medium is generated and recording data for the information recording medium is generated on the basis of the master data, master data containing a dummy data area in a partial area of the master data is generated, processes for identifying the dummy data area and setting significant information are performed on the basis of the stored information of an auxiliary file. Therefore, it is not necessary to obtain data of significant information when the master data is to be generated, and it becomes possible to generate the master data without obtaining specific information such as an encrypted key block.

According to the configuration of the present application, in an area where a medium key block (MKB) of a cutting master, which is provided from the content editing entity to the information recording medium manufacturing entity, is scheduled to be recorded, medium key block (MKB) dummy data, for example, all 0's, is recorded, and the cutting master is provided to the information recording medium manufacturing entity. In the information recording medium manufacturing entity, a disc image in which a medium key block (MKB) is set can be created in accordance with the position indicated by an auxiliary information file (MSTBL.DAT) for creating a disc image. In a state in which the content editing entity does not receive specific data, that is, a medium key block (MKB), a content hash table (CHT), a content certificate (Content_Cert), an encrypted unit key (Unit_Key.inf), a public key certificate (MF Key Certificate) of the information recording medium manufacturing entity, and the like, the information recording medium manufacturing entity receives or generates these pieces of data and becomes capable of to creating a disc image that is set at the position indicated by the auxiliary information file (MSTBL.DAT) for creating a disc image. Therefore, an efficient recording data generation process becomes possible. Furthermore, it is possible for the content editing entity to set the recording position of various kinds of information containing a medium key block (MKB) to any position, making it possible to improve the flexibility of data recording.

Additional features and advantages of the present application are described in, and will be apparent from, the following Detailed Description and the figures.

BRIEF DESCRIPTION OF THE FIGURES

FIG. 3 shows a content management unit configuration and an example of a unit key management table.

FIG. 12 illustrates an example of a specific structure of a content hash table associated with clips.

FIG. 15 is a flowchart illustrating a procedure for creating a disc image to be created as data to be stored on an information recording medium.

FIG. 16 illustrates data of an auxiliary file to be used in a process for encrypting content to be stored on an information recording medium.

FIG. 17 shows the syntax of an auxiliary file to be used in a process for encrypting content to be stored on an information recording medium.

FIG. 30 illustrates auxiliary file data on the medium key block (MKB).

FIG. 32 illustrates an example of the configuration of an information processing apparatus for recording and reproducing information, an information recording medium being installed into the information processing apparatus.

DETAILED DESCRIPTION

Figure 1:
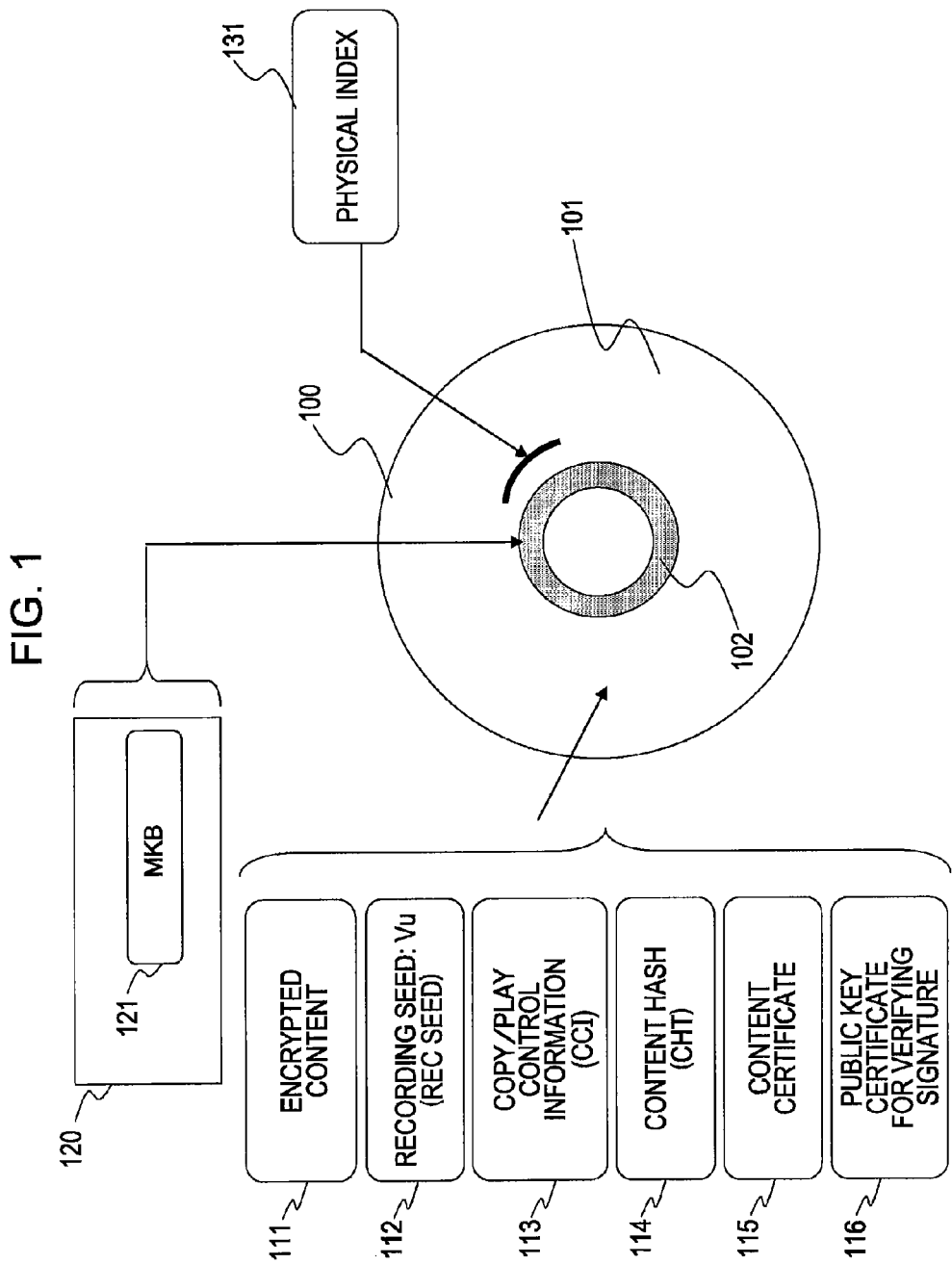
FIG. 1 illustrates the structure of stored data of an information recording medium.

With reference to the drawings, a description will be given below of details of an information processing apparatus, an information recording medium, a content management system, a data processing method, and a computer program according to the present invention. The description is given in accordance with the following described items.

1. Structure of stored data of information recording medium

2. Encryption of stored content, and use management configuration

3. Structure of data recording of information recording medium, encryption configuration, and details of content hash 4. Manufacturing of information recording medium, and details of data storage process 5. Verification process using content hash in content reproduction process 6. Generation of unit key, content decryption, and reproduction process 7. Details of medium key block (MKB), and recording process 8. Example of configuration of information processing apparatus

[1. Structure of Stored Data of Information Recording Medium]

First, the structure of stored data of an information recording medium will be described. FIG. 1 shows an example of an information recording medium on which content is stored, to which processing according to the present invention can be applied. Here, an example is shown in which information is stored on a ROM disc serving as a content-stored disc.

the ROM disc is, for example, an information recording medium, such as a Blu-ray disc or a DVD, and is an information recording medium on which valid content is stored, which is manufactured in a disc manufacturing factory under the permission of a so-called content right holder having an authorized content copyright or sales right. In the following embodiment, a description will be given using a disc-type medium as an example of an information recording medium. Alternatively, the present invention can be applied to a configuration in which information recording media of various formats are used.

As shown in FIG. 1, an information recording medium 100 has a data storage area 101 for storing data such as content, and a lead-in area 102 for storing related information corresponding to a disc and stored content, and key information used for a content decryption process.

In the data storage area 101, encrypted content 111, a recording seed (REC SEED) 112 serving as information that is necessary for generating a key used to decrypt encrypted content, CCI (Copy Control Information) 113 as content copy/play control information, a content hash 114 serving as a hash value of content, a content certificate 115 for indicating the authenticity of content, and a public key certificate 116 for verifying a signature, in which a public key used to verify a digital signature attached to the content certificate is stored, are stored. The content hash 114 is stored as a content hash table (CHT). The details of the content hash table (CHT) will be described later. The recording seed (REC SEED) 112, the CCI (Copy Control Information) 113, and the content hash 114 are used as information for generating an encrypted key (unit key) used to encrypt and decrypt content. The detailed structure thereof will be described later.

In the lead-in area 102, encrypted key information 120 necessary for generating a key used to decrypt the encrypted content 111 is stored. The encrypted key information 120 contains a media key block (MKB) 121 as an encrypted key block that is generated on the basis of a tree-structure key distribution system, which is known as one type of broadcast encryption method. Furthermore, on the information recording medium 100, a physical index 131 is recorded. The outline of these various pieces of information will be described below.

(1) Encrypted Content 111 on the information recording medium 100, various pieces of content are stored. They are, for example, main content composed of AV (Audio Visual) streams of moving image content such as HD (High Definition) movie content that is high-precision moving image data, game programs in a format defined by a specific standard, an image file, audio data, and text data. These pieces of content are specific AV-format standard data and are stored in accordance with a specific AV data format. Specifically, they are stored, for example, as Blu-ray disc ROM standard data in accordance with the Blu-ray disc ROM standard format.

Furthermore, there is also a case in which, for example, a game program, an image file, audio data, text data, and the like serving as service data are stored as subcontent. The subcontent is data having a data format that does not comply with a specific AV data format. That is, the subcontent can be stored as nonstandard Blu-ray disc ROM data in an optional format that does not comply with the Blu-ray disc ROM standard format.

Together with the main content and the subcontent, kinds of content include various kinds of content, such as music data, image data such as a moving image and a still image, a game program, WEB content, and the like. These pieces of content contain various kinds of information, such as content information that can be used with only data from the information recording medium 100, and content information that can be used in combination with data from the information recording medium 100 and data that is provided from a server connected via a network.

(2) Recording Seed 112 each content or a set of a plurality of pieces of content is each subjected to encryption using a separate encryption key (unit key) and is stored on the information recording medium 100 for the purpose of content use management. That is, AV (Audio Visual) streams forming content, music data, image data such as moving images and still images, game programs, WEB content, and the like are divided into units as content use management units, and a recording seed Vu 112 different for each divided unit is assigned.

for using content, an encryption key (unit key) corresponding to each unit is assigned in accordance with a predetermined encryption key generation sequence using the recording seed Vu 112 and the encryption key information 120. The unit at which one unit key is assigned is referred to as a content management unit (CPS unit). That is, the encrypted content 111 is divided in CPS units, is encrypted using a unit key corresponding to each CPS unit, and is stored on the information recording medium 100.

(3) Copy/Play Control Information (CCI) 113 the copy/play control information (CCI) 113 is copy limitation information or reproduction limitation information for use control corresponding to the encrypted content 111 stored on the information recording medium 100. The copy/play control information (CCI) 113 can be set variously, for example, being set as information for each CPS unit or being set so as to correspond to a plurality of CPS units. The details of this information will be described later.

(4) Content Hash 114

The content hash 114 is a hash value based on content stored on the information recording medium 100 or data forming encrypted content, and is used to check tampering of content. In the configuration of the present invention, a clip file as actual AV stream data forming a CPS unit is subdivided, a hash unit in units of predetermined data (for example, 192 KB) is set, and a hash value for each hash unit is computed. The hash value for each hash unit is recorded in the content hash table (CHT) and is stored on an information recording medium.

in the information processing apparatus (reproduction apparatus) for reproducing content from an information recording medium, a hash value is computed on the basis of the hash unit, and the computed hash value is compared with a comparison hash value of the corresponding hash unit recorded in the content hash table (CHT), which is stored on the information recording medium. When they match, it is determined that the content has not been tampered with, and the process proceeds to content decryption and reproduction processes. When they do not match, it is determined that the content has been tampered with, and the content decryption and reproduction processes are stopped. The details of these processes will be described later.

The content hash is also data used as information for generating an encrypted key used for content encryption and decryption processes. The ways of generating and using the content hash 114 will be described later.

(5) Content Certificate

The content certificate is a certificate for indicating the authenticity of content stored on an information recording medium. In the content certificate, data such as a content hash digest, based on a comparison hash unit stored in the content hash table (CHT), is stored, and furthermore, a digital signature is attached thereto. For example, a digital signature of an information recording medium manufacturing entity, which is a disc factory, is attached, thereby being formed as data for which tampering can be prevented. The details of the content certificate will be described in detail later.

(6) Public Key Certificate for Verifying Signature

The public key certificate for verifying a signature is a public key certificate in which a public key used to verify the digital signature of an information recording medium manufacturing entity is stored, the digital signature being attached to a content certificate.

(7) Physical Index 131

In the physical index 131, the category information of the information recording medium, for example, disc-related information such as the type of disc, and content-related information corresponding to the content stored in the data area 101, are recorded. Furthermore, similarly to the recording seed 112, there is also a case in which key information (key generation information) for generating a key used to decrypt encrypted content stored in the data storage area 101 of the information recording medium is recorded. The physical index 113 may be recorded in the lead-in area 102.

(8) Encrypted Key Information 120

Similarly to the above-described recording seed 112, the encrypted key information 120 includes an encrypted key block for obtaining key information (key generation information) for generating a key used to decrypt encrypted content stored in the data storage area 101 of the information recording medium, that is, an MKB (Media Key Block) 121 serving as an encrypted key block that is generated on the basis of a tree-structure key distribution system, which is known as one type of broadcast encryption method.

The MKB 121 is a key information block in which a media key (Km) that is a key necessary for decrypting content can be obtained by only the process (decryption) based on a device key stored in an information processing apparatus of a user having a valid license. This is such that the information distribution method in accordance with a so-called hierarchical tree structure enables a key to be obtained only when the user device (information processing apparatus) has a valid license, and can prevent a key (media key) of the user device that has been nullified (revoked) from being obtained. As a result of changing the key information to be stored in the MKB, it is possible for the management center to generate an MKB having a structure in which content cannot be decrypted using a device key stored in a specific user device, that is, a media key necessary for decrypting content cannot be obtained. Therefore, it is possible to revoke an unauthorized device at any timing and possible to provide encrypted content that can be decrypted to only a device having a valid license.

[2. Encryption of Stored Content and Use Management Structure]

Next, a description will be given, with reference to FIG. 2 and subsequent figures, of content management structure for realizing use control that differs for each of a plurality of pieces of content such that content stored on an information recording medium is divided.

as described above, content stored on the information recording medium is assigned with a key (unit key) that differs for each divided piece of content, is encrypted, and is stored for the purpose of realizing use control different for each piece of divided content. The unit at which one unit key is assigned is referred to as a content management unit (CPS unit).

When content belonging to each unit is encrypted using each unit key and the content is to be used, the key (unit key) assigned to each unit is obtained and reproduction is performed. Each unit key can be managed individually. For example, a unit key to be assigned to a particular unit A is set as a key that can be obtained from the information recording medium. Furthermore, a unit key to be assigned to a unit B can be obtained under the condition in which access is made to a server that is connected to a network and a user has performed a predetermined procedure. For example, the structure for obtaining and managing a key corresponding to each unit can be formed to be independent of each unit key.

Figure 2:
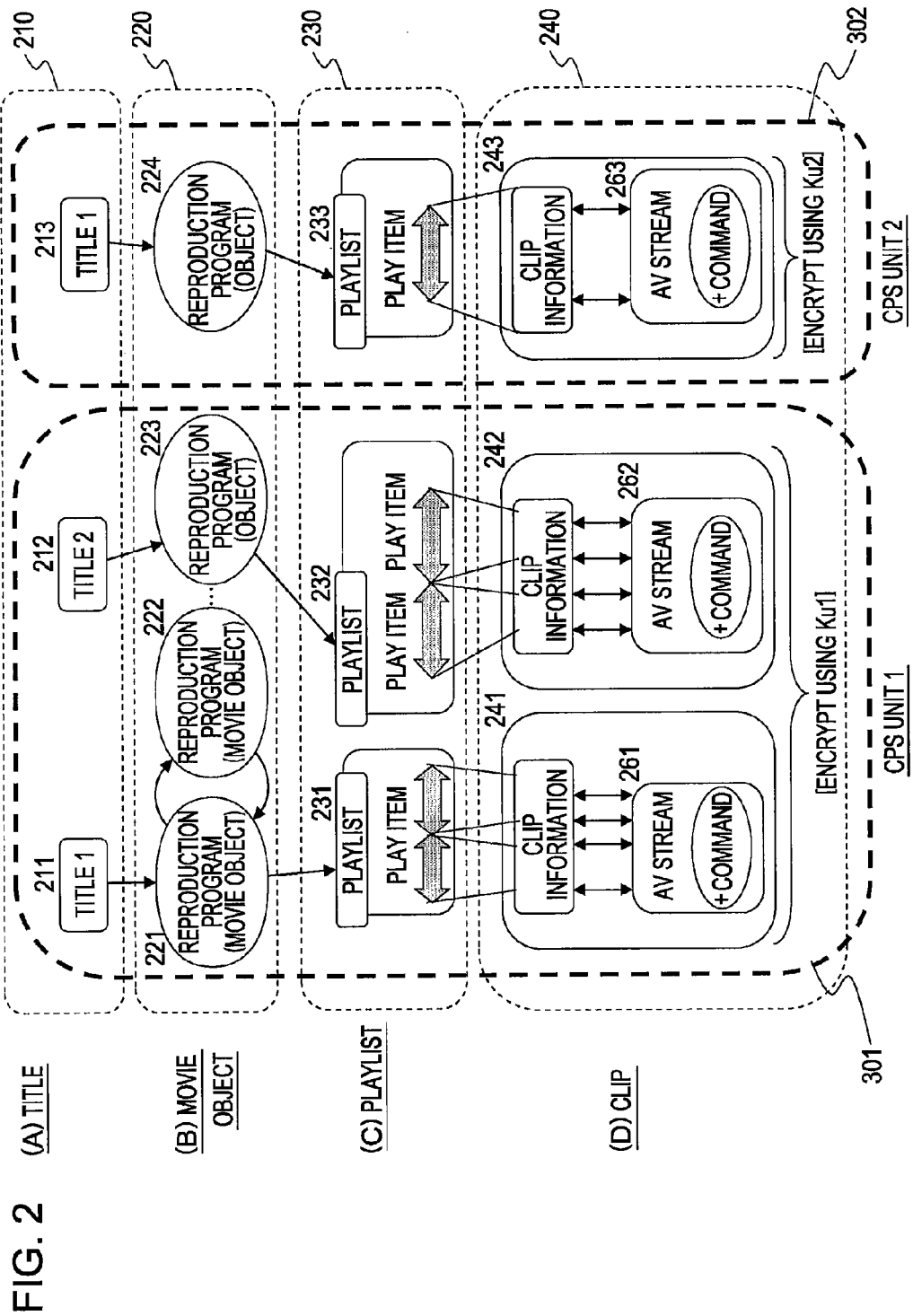
FIG. 2 illustrates an example of setting content management units to be set to stored content of an information recording medium.

A description will now be given, with reference to FIG. 2, of the manner of setting the unit at which one key is assigned, that is, the content management unit (CPS unit).

as shown in FIG. 2, content has a hierarchical structure of (A) a title 210, (B) a movie object 220, (C) a playlist 230, and (D) a clip 240. When a title as an index file that is accessed by a reproduction application, a reproduction program associated with the title is specified, a playlist that specifies a content reproduction sequence or the like in accordance with the program information of the specified reproduction program is selected, an AV stream as actual content data or a command is read on the basis of the clip information specified by the playlist, the AV stream is reproduced, and the command is executed.

FIG. 2 shows two CPS units. These constitute part of the content stored on the information recording medium. Each of CPS units 1 and 301 and CPS units 2 and 302 is a CPS unit that is set as a unit including a title as an application index, a movie object as a reproduction program file, a playlist, and a clip containing an AV stream file as actual content data.

the content management units (CPS units) 1 and 301 include titles 1 and 211, titles 2 and 212, reproduction programs 221 and 222, playlists 231 and 232, and clips 241 and 242, respectively. The AV stream data files 261 and 262, which are actual data of content contained in the two clips 241 and 242, are encrypted using a unit key Ku1, which is an encryption key that is set so as to correspond to the content management units (CPS units) 1 and 301, respectively.

the content management units (CPS unit) 2 and 302 include titles 3 and 213, a reproduction program 224, a playlist 233, and a clip 243. An AV stream data file 263, which is actual data of content contained in the clip 243, is encrypted using a unit key Ku2, which is an encryption key that is set so as to correspond to the content management units (CPS unit) 2 and 302, respectively.

for example, in order for the user to execute an application file or a content reproduction process corresponding to the content management units 1 and 301, it is necessary to obtain the unit key Ku1 as an encryption key that is set so as to correspond to the content management units (CPS units) 1 and 301, respectively, and necessary to perform a decryption process. After the decryption process is performed, an application program can be executed to reproduce content. In order to execute an application file or a content reproduction process corresponding to the content management units 2 and 302, it is necessary to obtain a unit key Ku2 serving as an encryption key that is set so as to correspond to the content management units (CPS units) 2 and 302, respectively, and necessary to perform a decryption process.

the reproduction application program to be executed in the information processing apparatus for reproducing content identifies a content management unit (CPS unit) corresponding to content specified to be reproduced by the user, and performs a process for obtaining a CPS encryption key corresponding to the identified CPS management unit information. When the CPS encryption key cannot be obtained, a message indicating that reproduction is not possible is displayed, and the like. Furthermore, the reproduction application program detects an occurrence of switching of the content management unit (CPS unit) when the content is reproduced, obtains a necessary key, displays a message indicating that reproduction is not possible, and the like.

the reproduction application program performs reproduction management on the basis of a unit structure and unit key management table shown in FIG. 3. The unit structure and unit key management table, as shown in FIG. 3, is a table in which indexes of application layers or application files, the content management units (CPS units) corresponding to data groups, and unit key information are made to correspond to one another. The reproduction application program performs management on the basis of the management table.

when, for example, the reproduction application program detects an occurrence of switching of the content management unit (CPS unit) as a result of the switching of the application index, the reproduction application program switches the key to be used by switching the content management unit (CPS unit). Alternatively, the reproduction application program performs a process for displaying a message indicating that a unit key needs to be obtained.

for example, in a case in which the unit key Ku1 of the content management units (CPS units) 1 and 301 is stored in the reproduction apparatus that is performing a content reproduction process and the unit key Ku2 of the content management units (CPS units) 2 and 302 is also stored therein, when the reproduction application program for centrally controlling the content reproduction process detects that the unit of the application has been switched or content has been switched, the reproduction application program switches the unit key corresponding to the switching of the content management unit (CPS unit), that is, switches from Ku1 to Ku2.

in a case in which the unit key Ku1 of the content management units (CPS units) 1 and 301 is stored in the reproduction apparatus that is performing a content reproduction process and the unit key Ku2 of the content management units (CPS units) 2 and 302 is not stored therein, when the reproduction application program for centrally controlling the content reproduction process detects that the unit of the application has been switched or the content has been switched, the reproduction application program performs a process for displaying a message indicating that a unit key needs to be obtained.

[3. Data Recording Structure of Information Recording Medium, Encryption Configuration, and Details of Content Hash]

Figure 4:
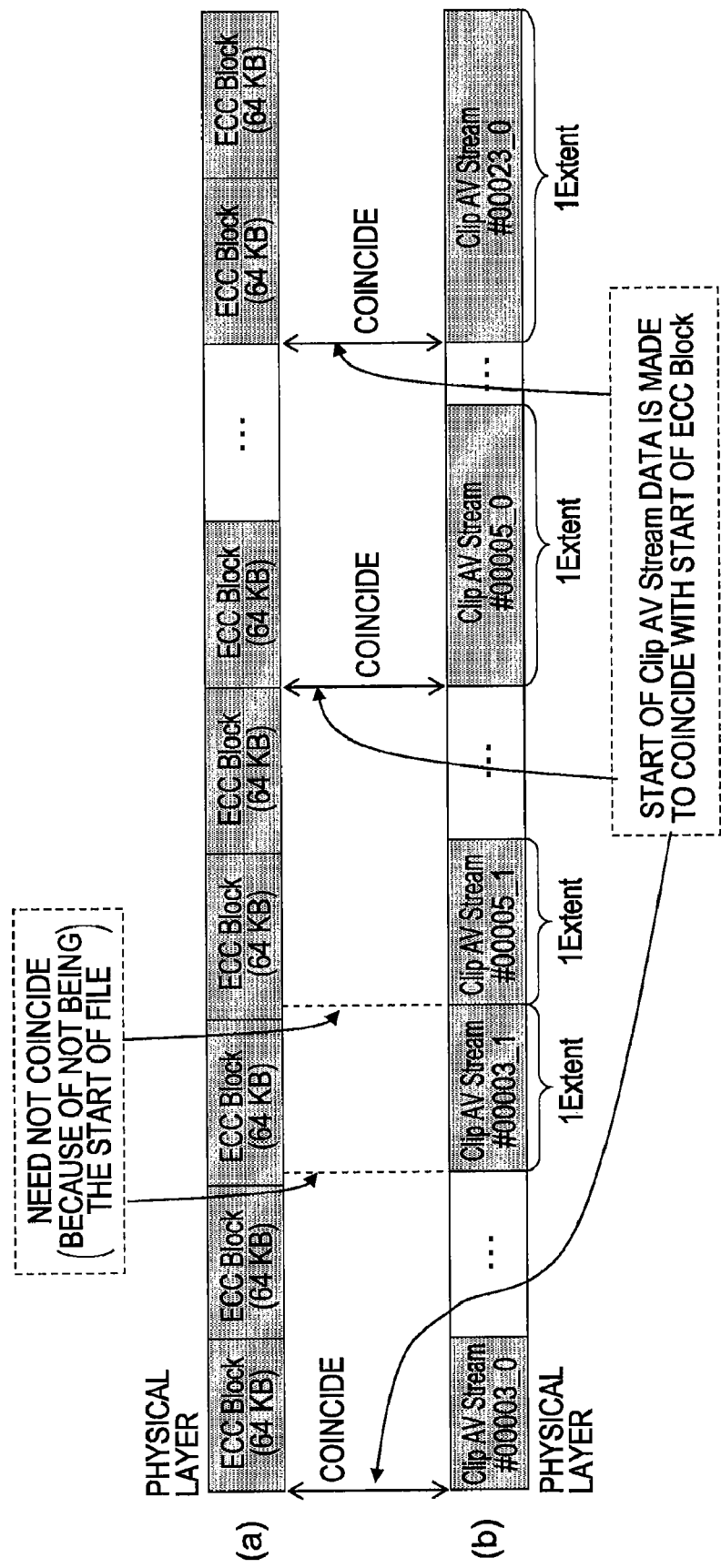
FIG. 4 illustrates the data recording structure of an information recording medium, and also illustrates the correspondence between ECC blocks and clip AV streams in a physical layer.

Next, a description will be given of the data recording structure of an information recording medium, encryption configuration, and details of a content hash. Initially, referring to FIG. 4, a description will be given of the correspondence between clip files and ECC blocks. For data to be stored on an information recording medium, data is recorded in units of ECC blocks as a minimum data recording and reproducing unit of a drive for performing content recording and reproduction. In this example, the ECC block is set as data of 64 KB, as shown in FIG. 4(*a*). FIG. 4(*a*) shows the data recording structure in a physical layer, and FIG. 4(*b*) shows a clip file, which is recorded content corresponding to the physical layer.

for content, as illustrated with reference to FIG. 2, a clip file is set as a management unit. In FIG. 4(*b*), an example of the structure is shown in which, as clip AV streams, a plurality of the following clip files are recorded:

clip No.=#00003,
clip No.=#00005, and
clip No.=#00023.

in the example of the figure, each clip file of clips #00001 to #00023 is stored on an information recording medium. Each clip is subdivided, and the subdivided data is distributed and recorded as data #000nn_x in one contiguous recording area (Extent), which is managed by UDF (universal disc format).

in the data recording structure of the information recording medium according to the present invention, the start data of each clip, that is, data [#000nn_0], which is the start data of the AV stream data of the clip file, is recorded in such a manner as to correspond to the start of the ECC block (64 KB) in the physical layer. This is for the purpose of efficiently performing processing, such as reading of a hash unit set in such a manner as to correspond to each clip file and the computation of a hash value from a hash unit. These processes will be described in detail later.

in this embodiment, only the data [#000nn_0] that is the start data of the AV stream data of a clip file is recorded in such a manner as to coincide with the start of the ECC block (64 KB) in the physical layer. It is not necessary that the other succeeding data [#000nn_1 . . . ] coincide with the start of the ECC block. However, the start of the entire contiguous recording area (Extent) may be recorded in such a manner as to coincide with the start of the ECC block. With this configuration, the hash value can be computed more efficiently.

Figure 5:
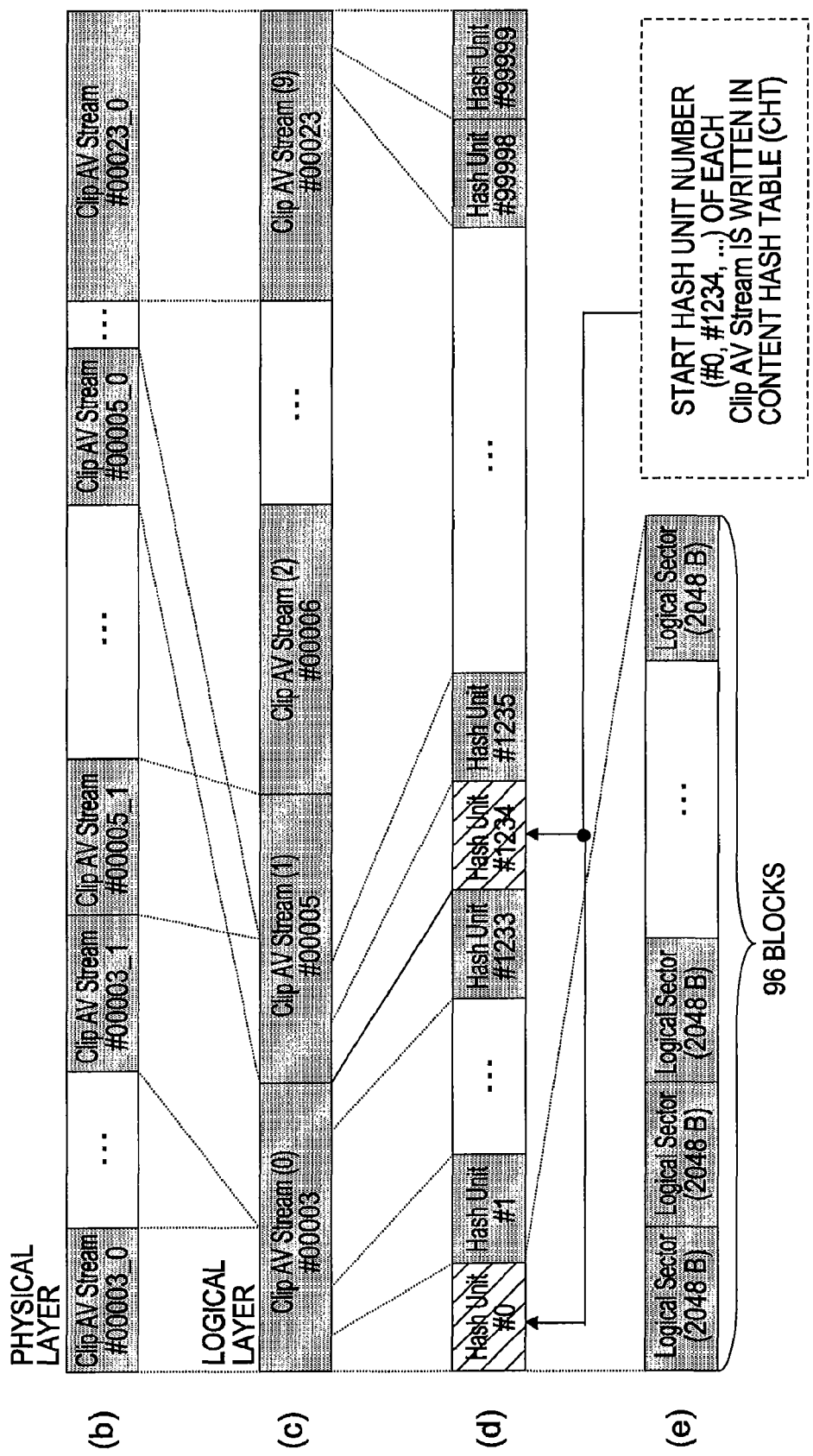
FIG. 5 illustrates the data recording structure of an information recording medium, and also illustrates the correspondence between clip AV streams in a physical layer; and clip AV streams and hash units in a logical layer.

Next, a description will be given, with reference to FIG. 5, of the correspondence between clip files and hash units. As described above, the content hash 114 as stored data of the information recording medium 100, described with reference to FIG. 1, is a hash value based on content stored on the information recording medium 100 or data forming encrypted content, and is used to check tampering of content. In the configuration of the present invention, a clip file as actual AV stream data forming CPS units is subdivided, a hash unit in units of predetermined data (for example, 192 KB) is set, a hash value for each hash unit is computed, the hash value for each hash unit is recorded in a content hash table (CHT), and it is stored on the information recording medium.

part (b) shown in the topmost stage illustrated in FIG. 5 shows the arrangement of clip files in the physical layer, which correspond to part (b) shown in FIG. 4. The data forming each clip file, as described above, can be subdivided and recorded in a distributed manner on an information recording medium. As shown in FIG. 5(*c*), in a logical layer, these distributed pieces of data are managed for each clip file. A reproduction application in the information processing apparatus for performing a content reproduction process reads data forming a clip file that is recorded in a distributed manner on an information recording medium in accordance with an address, forms one clip file in a logical layer, and performs a data decryption process, a reproduction process, and the like.

the reproduction application in the information processing apparatus for performing a content reproduction process performs a process for checking tampering of content. The checking for tampering of content involves, for example, randomly selecting a plurality of hash units from the clip file selected as an object to be reproduced, computing a hash value of content data corresponding to the selected hash unit, and comparing the computed hash value with the stored value (the comparison hash value) of the content hash table (CHT), which is prerecorded on the information recording medium. When the hash values match, it is determined that the content has not been tampered with, and the process proceeds to content decryption and reproduction processes. If the hash values do not match, it is determined that the content has been tampered with, and the content decryption and reproduction processes are stopped.

as shown in FIG. 5(*d*), the hash units are set in units of data (192 KB) such that a clip file in a logical layer is subdivided. As shown in FIG. 5(*e*), each hash unit corresponds to data for 96 logical sectors (2048 B).

as shown in FIG. 5(*d*), a hash unit number (#0, #1, #2 . . . ) is set to a hash unit that is set in such a manner as to correspond to each clip file. FIG. 5 shows an example of a structure in which a clip file (#00003) contains hash units #0 to #1233 and a clip file (#00005) contains hash units #1234 . . . .

in the content hash table (CHT) stored on the information recording medium, a hash value (comparison hash value) of each hash unit is stored and also, the start hash unit number of each clip file is recorded. With this structure, it becomes possible for the information processing apparatus (reproduction apparatus) for performing hash value verification to efficiently select a hash unit to be verified, corresponding to the clip to be reproduced on the basis of the start hash unit number of the clip file recorded in the content hash table (CHT). The details of the structure of the content hash table (CHT) and processing in which the CHT is used will be described in detail later.

Figure 6:
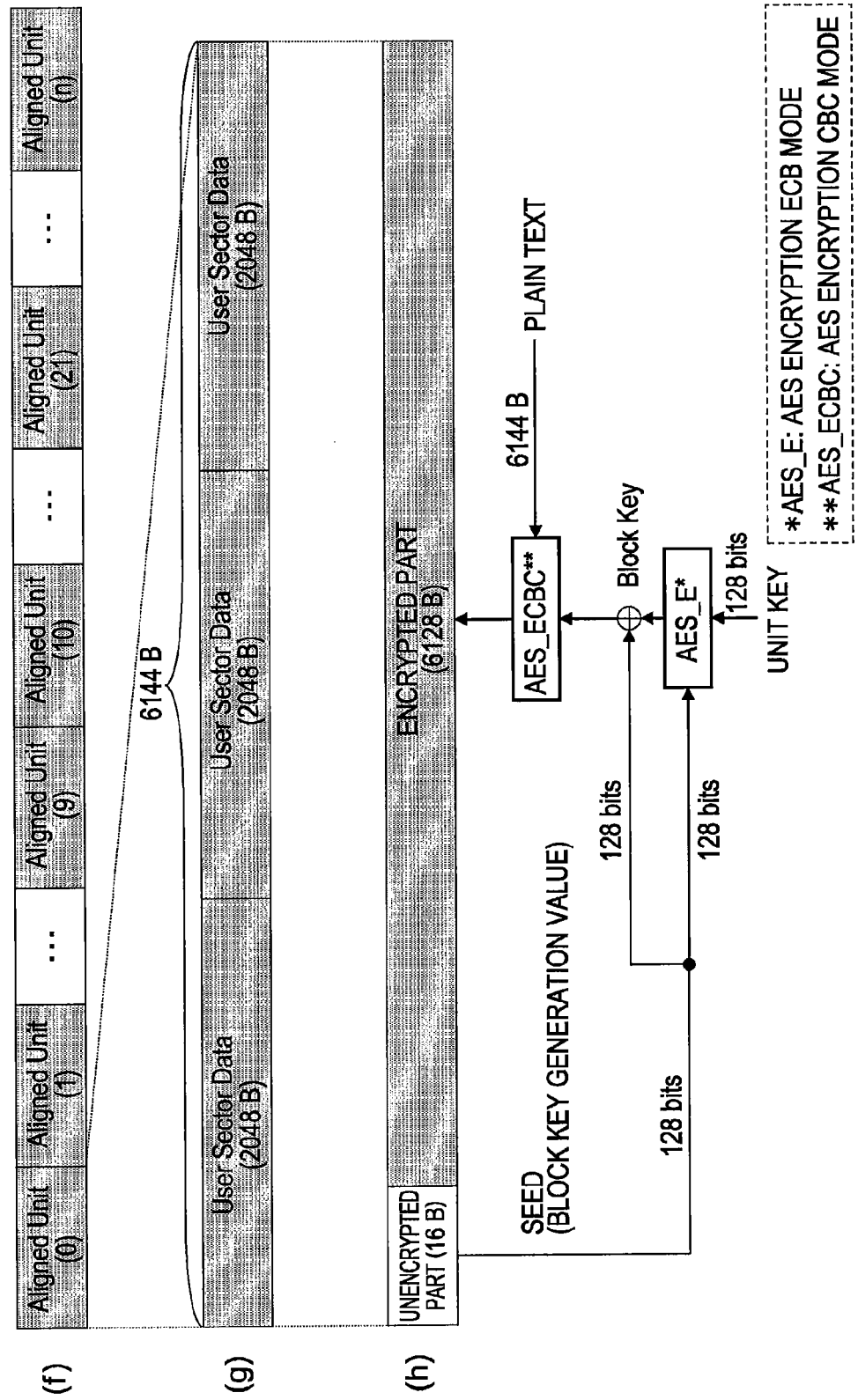
FIG. 6 illustrates the data recording structure of an information recording medium and encryption processing configuration.

FIG. 6 illustrates encryption processing configuration of data stored on an information recording medium. Encryption of content is performed in units of aligned units that are set as encryption processing units shown in FIG. 6(*f*). As shown in FIG. 6(*g*), one encryption processing unit (Aligned Unit) is formed of 6144 B (bytes) of three pieces of sector data (2048 B (bytes)). One sector data corresponds to one sector data of FIG. 5(*e*).

as shown in FIG. 6(*h*), one encryption processing unit (Aligned Unit) is formed of an unencrypted part of 16 bytes and an encrypted part of 6128 bytes. A seed as a block key generation value is obtained from the unencrypted part. A block key is generated by an encryption process (AES_E) and exclusive OR operation with a unit key generated on the basis of various kinds of information, such as a medium key obtained from the medium key block, described with reference to FIG. 1. An encryption process (AES_ECBC) is performed on plain text, and encrypted data of 6128 bytes is generated.

An encryption process using a block key is performed by using a CBC mode of an AES encryption algorithm. This encryption process will be described with reference to FIG. 7.

Figure 7:
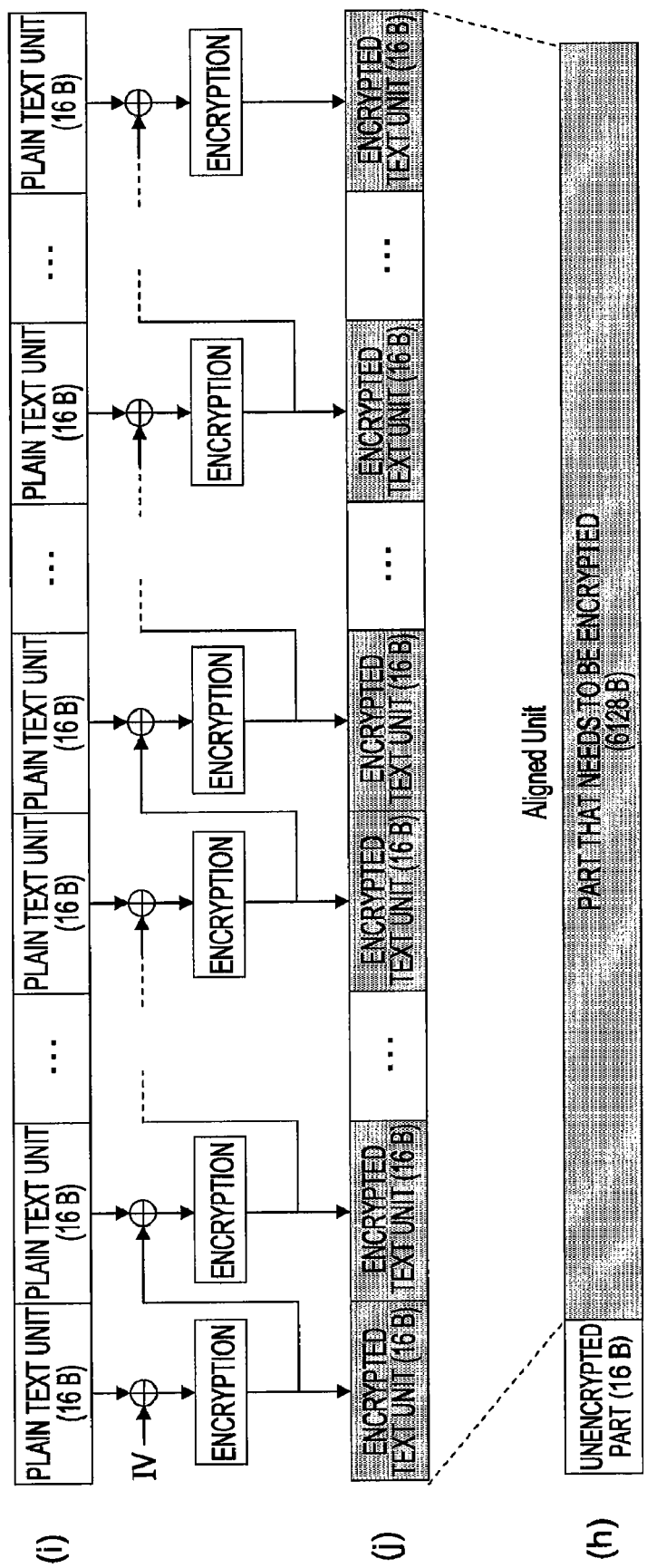
FIG. 7 illustrates the encryption processing configuration of stored content of an information recording medium.

FIG. 7(*i*) shows plain text of content stored on an information recording medium. The plain text is divided in units of 16 bytes and a repeated processing is performed in which each divided block is encrypted via an exclusive OR operation and an encryptor (AES), the resulting data is XORed with the succeeding 16-byte data, and AES encryption is performed. The outputs of the encryptor (AES) are concatenated, and encrypted data shown in FIG. 7(*j*) is generated. This encrypted data is data of FIG. 7(h). This data is the same as data of FIG. 6(h) and becomes encrypted part of 6128 bytes of one encryption processing unit (Aligned Unit), which is formed of three pieces of sector data of 2048 bytes. The initial value (IV) at which an exclusive OR operation process is performed with the start plain text unit of 16 bytes is a seed obtained from the unencrypted part shown in FIG. 6(h).

the encrypted data generated in the manner described above is divided into ECC blocks and is recorded on an information recording medium. The information processing apparatus (reproduction apparatus) for performing a content reproduction process performs a decryption process identical to that in the CBC in accordance with the AES encryption algorithm shown in FIG. 7 and performs a process for generating decrypted data (plain text) from the encrypted data.

Figure 8:
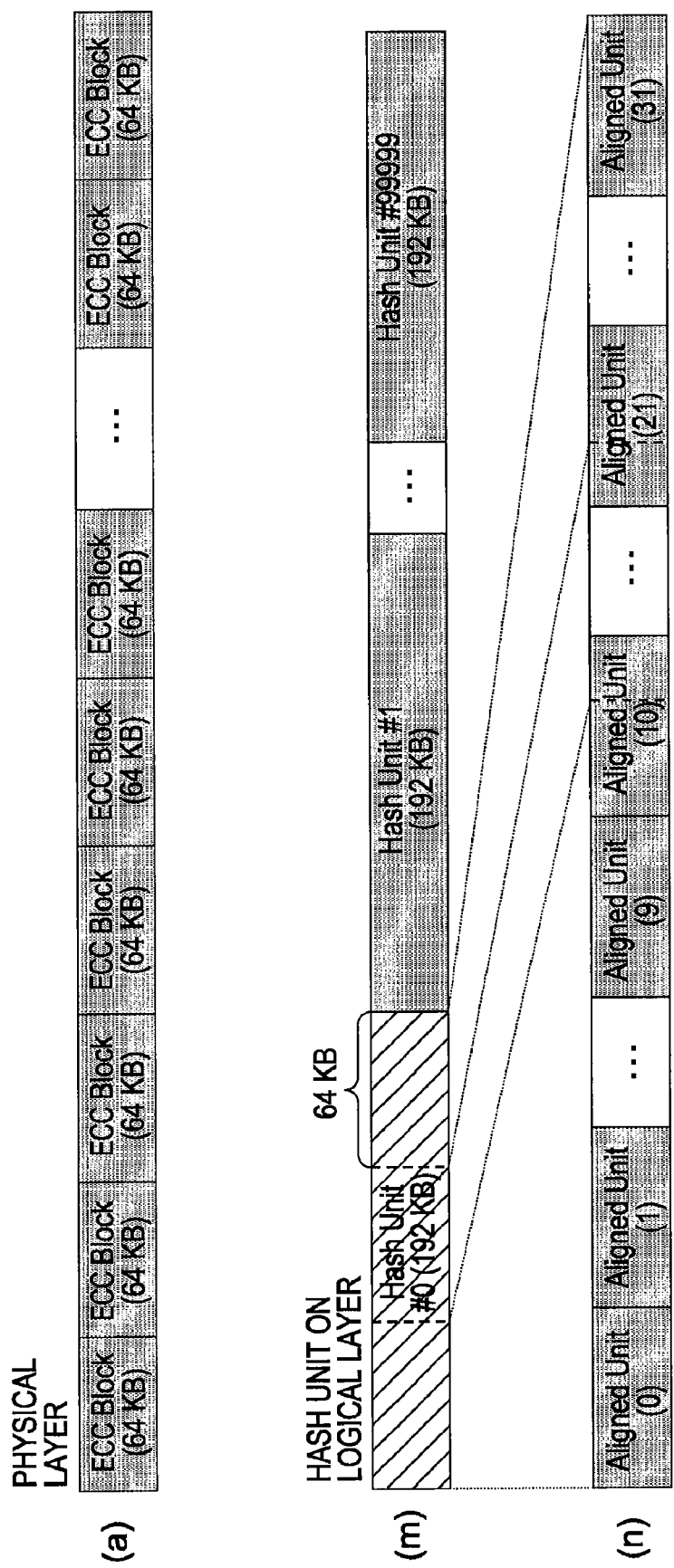
FIG. 8 illustrates the data recording structure of an information recording medium, and also illustrates the correspondence between hash units and aligned units.

Next, a description will be given, with reference to FIG. 8, of the correspondence between the arrangement of ECC blocks recorded on the information recording medium and the arrangement of hash units. FIG. 8(a) shows the arrangement of ECC blocks in the physical layer identical to that of FIG. 4(a). FIG. 8(m) shows the arrangement of hash units in the logical layer. As described with reference to FIG. 5, each hash unit corresponds to data forming any one of the clip files, and each hash unit is formed of data of a predetermined data length (for example, 192 KB).

the size of the hash unit is 192 KB. On the other hand, the size of the ECC block is 64 KB. Therefore, one hash unit is set to the same data length as that of three ECC blocks. The ECC block is a processing unit for data recording and reproduction in the drive. Prior to reproducing content, the information processing apparatus (reproduction apparatus) reads one or more hash units belonging to a content management unit (CPS unit) to be reproduced, computes a hash value, and compares the hash value with a comparison hash value recorded in the content hash table (CHT).

In this case, the drive reads data in units of ECC blocks. Logical sectors in the logical layer can be recorded in such a manner as to be distributed in the physical sectors in the physical layer. However, in many cases, for example, sector data contained in one clip file, that is, sector data that is consecutive in the logical layer, is often recorded consecutively also in the physical layer.

the data recording structure of the present invention, as described previously with reference to FIG. 4, is a structure in which recording is performed with the start of each clip file coinciding with the start of the ECC block in the physical layer. Furthermore, each hash unit (192 KB) is set to a data length at an integral multiple (three times as large) of the ECC block (64 KB). As a result, in most cases, the reading of the hash unit is realized by reading three ECC blocks. As a result, in most cases, the information processing apparatus that performs data verification on the basis of a hash value becomes possible to realize a data reading process in the hash verification by reading a minimum of ECC blocks, making it possible to perform an efficient verification process.

as shown in FIG. 8(n), the hash unit corresponds to concatenated data of aligned units as the data processing units (encryption processing units). The aligned units of FIG. 8(n) show the arrangement in the logical layer. In the data recording structure of the present invention, the arrangement of the physical layer often shows an identical arrangement.

Figure 9:
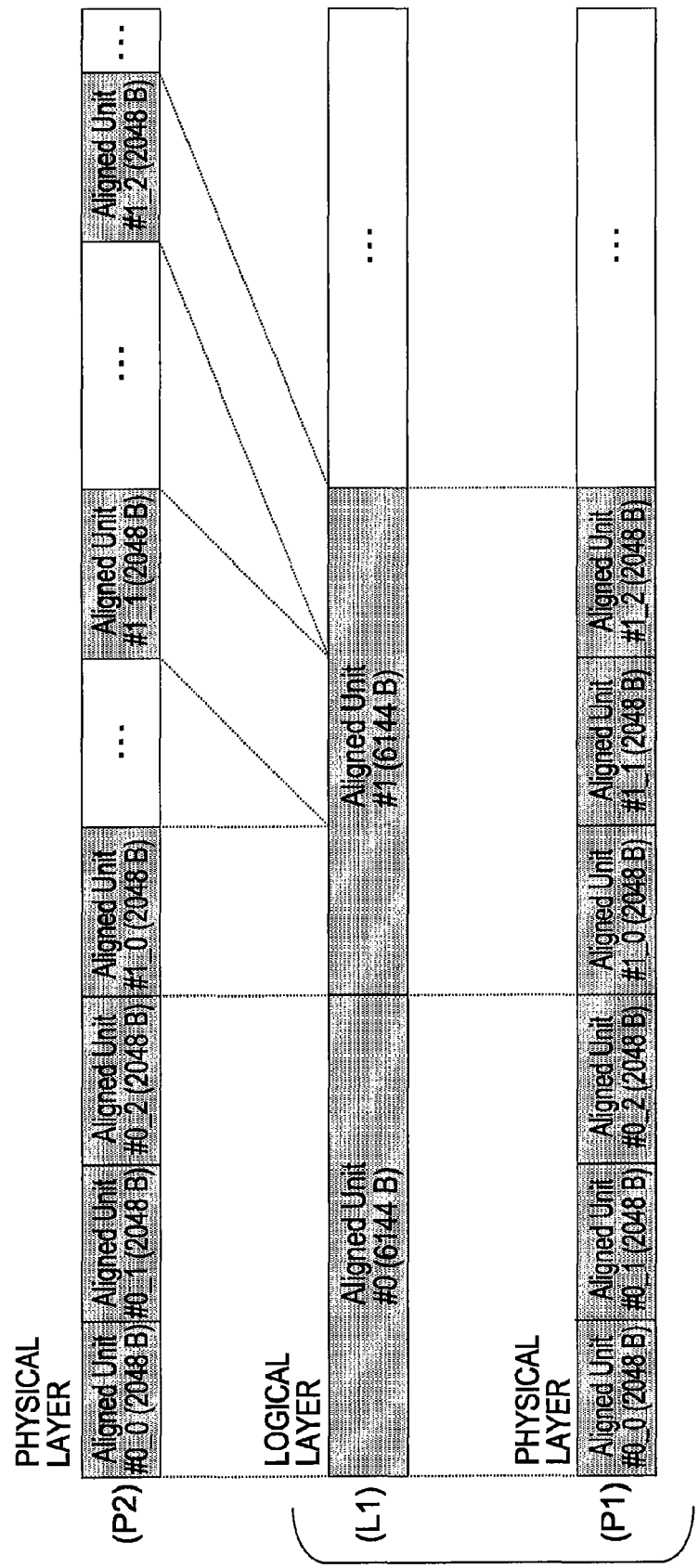
FIG. 9 illustrates the data recording structure of an information recording AV medium, and also illustrates the correspondence between aligned units in a physical layer and in a logical layer.

A description will now be given, with reference to FIG. 9, of the correspondence between the arrangement of the aligned units in the logical layer as data processing units (encryption processing units) and the arrangement in the physical layer. FIG. 9(L1) shows the arrangement of aligned units in the logical layer. FIG. 9(P1) shows the arrangement of aligned units in the physical layer when the structure of the present invention is applied. FIG. 9(L2) at the topmost stage shows the arrangement of aligned units in the physical layer when a data recording process of the related art is performed.

in the structure of the present invention, that is, in the aligned unit arrangement in the logical layer of FIG. 9(L1) and in the aligned unit arrangement in the physical layer of FIG. 9(P1), at least the data at the start part of each clip file is arranged so as to coincide with each other as shown in the figures. This is due to the fact that the data recording process described previously with reference to FIG. 4, that is, data recording with the start part of the clip file coinciding with the start of the ECC block in the physical layer is performed. In the related art, since such data recording is not performed, as shown in FIG. 9(P2), in the physical layer, aligned units as data processing units (encryption processing unit) are often recorded in a separated manner. Under the current rule, it is prohibited that the logical sectors (2048 B) are further subdivided. However, aligned units (6144 B=2048 B×3) in encryption units are divided for each sector (2048 B). As a result, data in various portions shown in FIG. 9(P2) are often concatenated.

as a result of adopting the data recording structure (FIG. 9(P1)) of the present invention, recording medium access when computing a hash is made efficient and also, an efficient process becomes possible in the process for encrypting content to be stored on an information recording medium. That is, as shown in FIG. 9(P2), when an aligned unit is divided and recorded in the physical layer, an encryption process when data is recorded, and a process for performing a decryption process when data is to be reproduced become inefficient. As described above, the CBC mode is used for the encryption and decryption of content. The unit of the concentration is 6144 B (=the size of the aligned unit). Therefore, for encrypting and decrypting aligned unit #X_1 and aligned unit #X_2, the last 16 B (the minimum unit of the AES of the (logically) immediately preceding aligned unit becomes necessary.

More specifically, as described previously with reference to FIG. 7, the encryption process includes a process for performing operation (exclusive OR) between the operation result of a particular unit and a succeeding unit. When the logical sector in the aligned unit has been divided, in the case that aligned unit #1_1 is to be encrypted, the last 16 B of the aligned unit #1_0 needs to be held while the separated data is being accessed. One piece of data contains many aligned units, and the access time of the separated units is accumulated when data is recorded or reproduced. Such access standby time is accumulated, and as a result, data processing efficiency is decreased. In contrast with this, with an arrangement such as that of FIG. 9(P1), since each unit is arranged consecutively, access during data recording and reproduction can be made continuously, the data access time is decreased, and efficient processing becomes possible.

Figure 10:
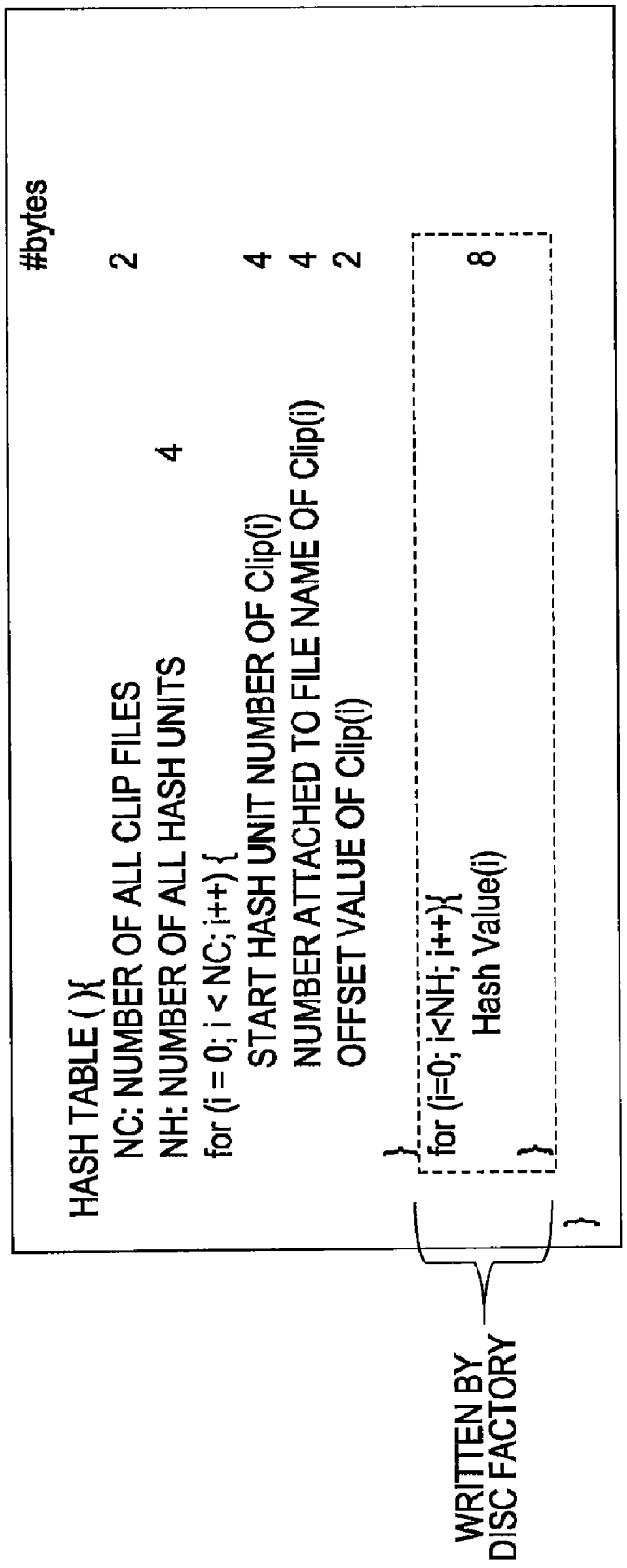
FIG. 10 illustrates an example of the structure of a content hash table.

Next, a description will be given of an example of the structure of a content hash table (CHT) in which comparison hash values corresponding to hash units, that is, hash values that are calculated in advance on the basis of valid content data, are stored. FIG. 10 shows an example of the data structure of one content hash table (CHT) that is set to one recording layer of an information recording medium.

in the content hash table (CHT), following each data of the number (NC) of all the clips and the number (NH) of all the hash units is recorded, each data of the following is recorded with respect to each clip(i):
  the start hash unit number of clip(i),
  the number corresponding to the file name of clip(i), and
  the offset value of clip(i).

Furthermore, [Hash Value] as a hash value (comparison hash value) for each hash unit is recorded for each clip.

[Hash Value] as a hash value (comparison hash value) for each hash unit is recorded by, for example, a disc factory that performs a process for recording valid content.

Figure 11:
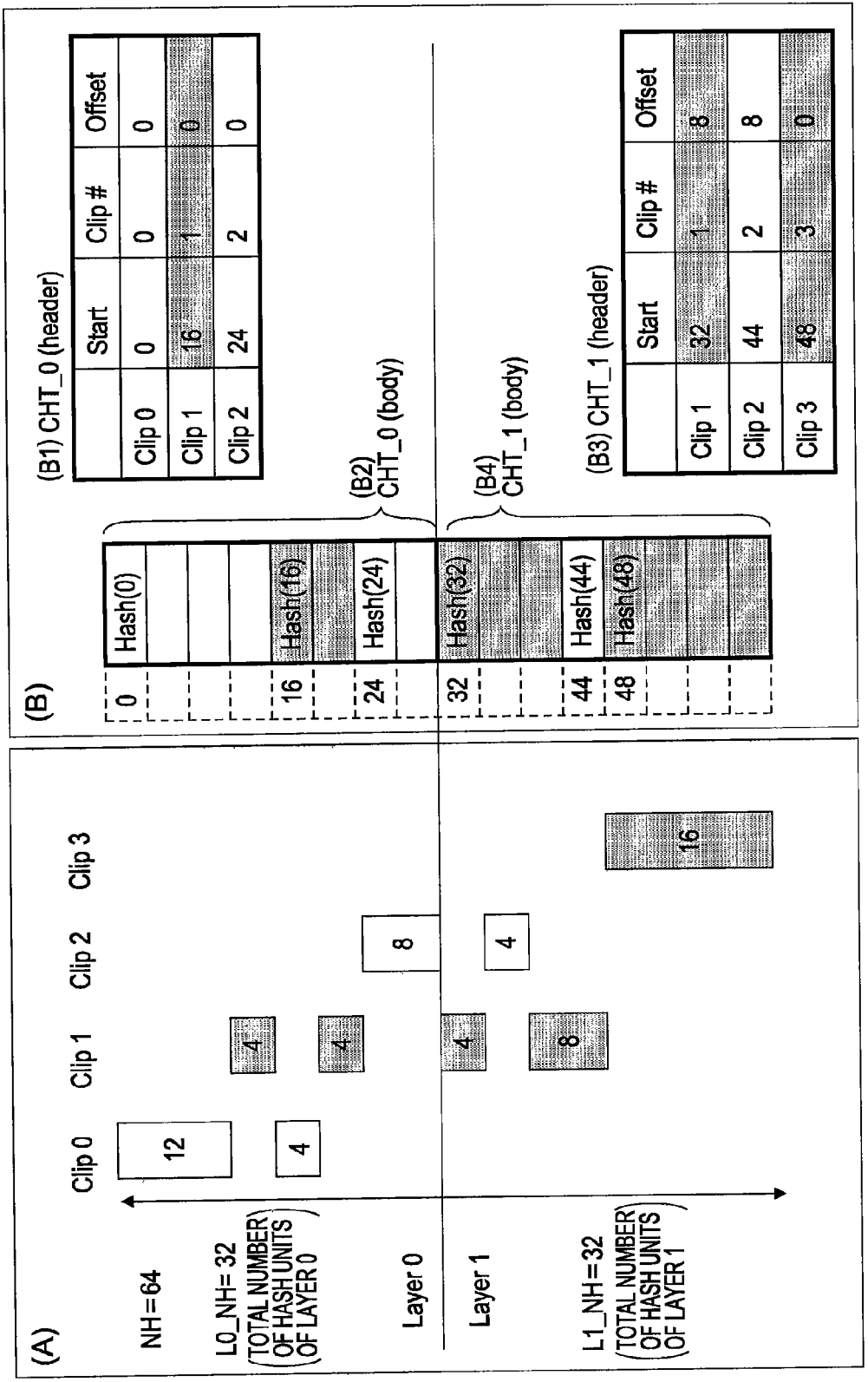
FIG. 11 illustrates an example of a specific structure of the content hash table.

When, for example, content verification is performed by hash value computation and comparison processes in an information processing apparatus (reproduction apparatus), the number (NH) of all the hash units is used in the case that a number as a selection range for the hash unit number is obtained when a hash unit number is randomly selected. Specific examples of processing will be described later.

tampering detection accuracy can be increased by selecting a hash unit with respect to all the hash numbers. If a method is used in which the number of hash units is not used, a clip number is randomly selected from all the numbers, and hash units are randomly selected from within the selected clip, for example, when "999 clip files of an extremely small size, which have not been tampered with" and "one clip file of a large size, which has been tampered with" are recorded on a disc, the possibility of detecting tampering is decreased. However, with the configuration in which hash units are selected with respect to all the hash numbers, it is possible to increase the possibility of detecting tampering.

for the start hash unit number of clip(i), numbers of 0 to NC are given correspondingly to clip files (for example, a maximum of 1000) on a disc. Then, the number in the whole of the logically start hash unit of the hash units belonging to each clip file is written. This is the same as that described previously with reference to FIG. 5.

the offset value of the clip(i) is an identification value of a layer (recording layer) of the disc. The offset value of the layer 0 is all 0's. The offset value of the layer 1 is set as a value indicating the number of hash units of a clip contained in the layer 0. This value enables the logical address of the hash unit in the table of the layer 1 to be easily known.

the information processing apparatus (reproduction apparatus) for reproducing content from an information recording medium is able to check tampering of content by comparing a hash value calculated from any hash unit on the information recording medium with a comparison hash value written in a content hash table when the information recording medium is to be reproduced.

a specific structure of the content hash table (CHT) will be described with reference to FIG. 11. FIG. 11(A) shows the data recording structure of an information recording medium (disc) having two recording layers (layers 0 and 1). FIG. 11(B) shows the structure of a content hash table associated with the recording data.

as shown in FIG. 11(A), on the information recording medium (disc) having two recording layers (layers 0 and 1), four clips (clips 0 to 3) are recorded, and the total number of the hash units is 64. The clip 0 has 16 hash units, and all of them are recorded in the layer 0. For the clip 1, eight hash units are recorded in the layer 0, and 12 hash units are recorded in the layer 1. For the clip 2, eight hash units are recorded in the layer 0, and four hash units are recorded in the layer 1. The clip 3 is a clip in which 16 hash units are recorded in the layer 1.

the total number (L0_NH) of hash units in the layer 0=32, and the total number (L1_NH) of hash units in the layer 1=32.

in this structure, the content hash table (CHT) is set in units of layers, and two content hash tables are recorded. FIG. 11(B) shows each data of the header and the body of the content hash table. Part (B1) indicates the header data of the content hash table in the layer 0, and the following values are stored with respect to each clip (clips 0 to 2) contained in the layer 0:

the start hash unit number of clip(i)=Start, the number corresponding to the file name of clip(i)=Clip#, and the offset value of clip(i)=Offset.

Part (B2) indicates the body data of the content hash table in the layer 0, and the comparison hash value of each hash unit (the hash numbers 0 to 31) contained in the layer 0 is stored.

Part (B3) indicates the header data of the content hash table in the layer 1 and stores the following values with respect to each clip (clips 1 to 3):

the start hash unit number of clip(i)=Start, the number corresponding to the file name of clip(i)=Clip#, and the offset value of clip(i)=Offset.

Part (B4) indicates the body data of the content hash table in the layer 1 and stores the comparison hash value of each hash unit (hash numbers 32 to 63) contained in the layer 0.

the information processing apparatus (reproduction apparatus) for reproducing content from an information recording medium checks tampering of content by comparing a hash value calculated from any hash unit of content on the information recording medium when the information recording medium is to be reproduced with a comparison hash value written in a content hash table. These processes will be described later.

Next, a description will be given, with reference to FIG. 12, of another example of the structure of the content hash table (CHT). FIG. 12(A) shows an example of a content hash table (CHT) when one content hash table (CHT) is set for each clip file. Content hash tables (CHT) corresponding to the number of clips will be stored on an information recording medium.

in the content hash table (CHT) shown in FIG. 12(A), identification information indicating which clip number the content hash table (CHT) corresponds to is contained, and then the following information on the target clip (n) is recorded:

the number (NH) of all the hash units, the CPS unit number to which the clip (n) belongs, and

[Hash Value] as a hash value (comparison hash value) for each hash unit.

in the structure in which one content hash table (CHT) is set in one clip file, furthermore, a content hash table-clip file association table shown in FIG. 12(B) is stored.

in the content hash table/clip file association table, following each data of the number of all the clips (NC), and the number (NH) of all the hash units, each of the following data is recorded with respect to each clip(i):

the start hash unit number of the clip(i), and the number corresponding to the file name of the clip(i).

as shown in FIG. 12(A), in the structure in which one content hash table (CHT) is set with respect to one clip file, for example, when an information processing apparatus for reproducing content is going to access a particular clip AV stream #xxxxx, it is necessary to select a hash unit corresponding to the clip AV stream #xxxxx and to perform hash computation and comparison. When performing this selection process, information on the correspondence between the clip AV stream file number #xxxxx and the hash table is necessary. As this correspondence information, the content hash table/clip file association table of FIG. 12(B) is used.

As a structure in which content hash table/clip file association table shown in FIG. 12(B) is not used and, for example, identification data corresponding to the clip AV stream file number #xxxxx is set to the data file name of the content hash table (CHT), a structure for enabling the identification as to which AV stream data file the data file of the content hash table (CHT) corresponds to may be used. For example, the data file name of the content hash table (CHT) is set as [CHT_XXXX.dat].

Figure 13:
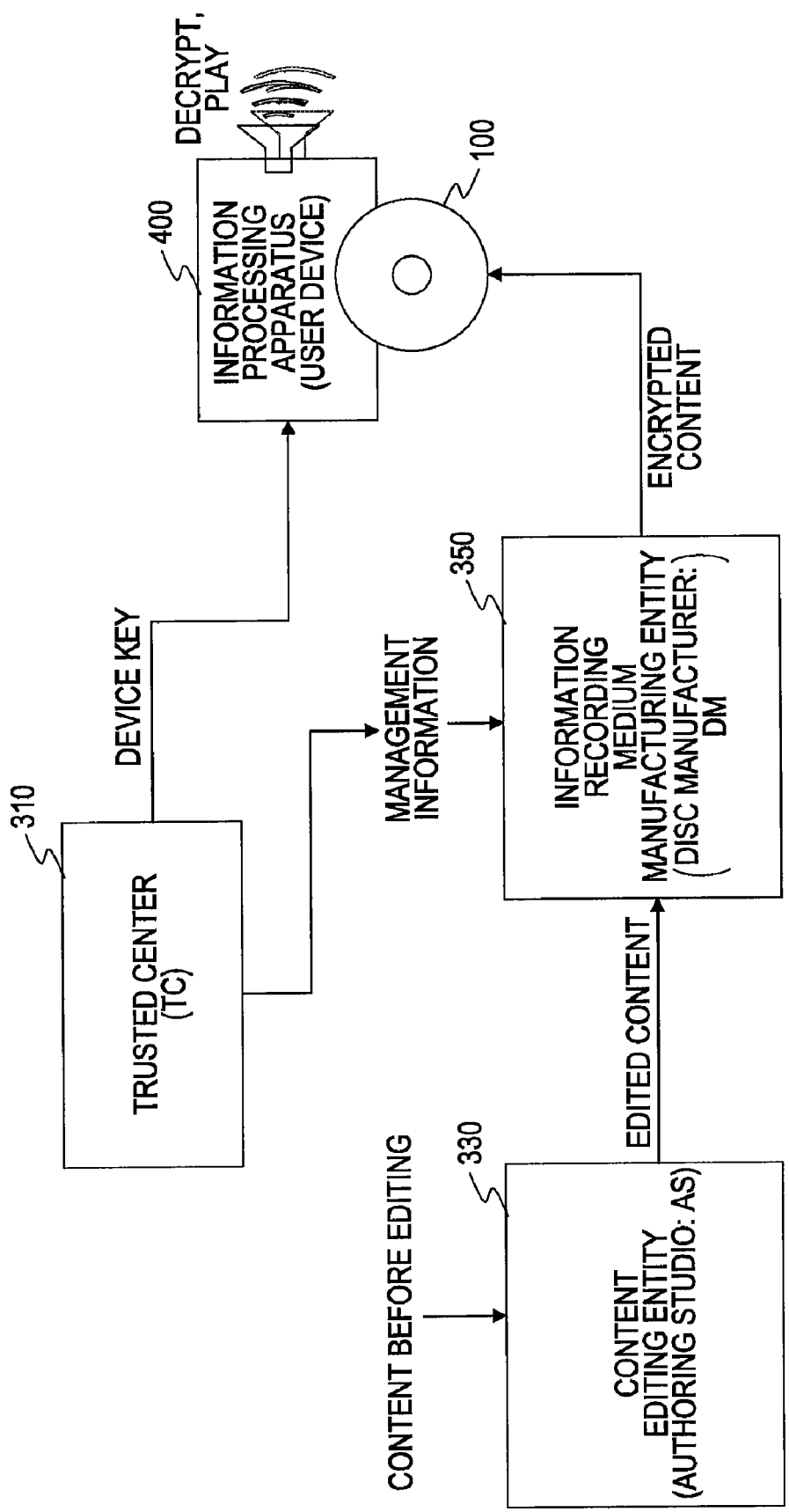
FIG. 13 illustrates the outline of processing of a management center, a content editing entity, and an information recording medium manufacturing entity in information recording medium manufacturing steps.

[4. Manufacturing of Information Recording Medium, and Details of Data Storage Process]

as described above, together with content, a hash value that is set in such a manner as to correspond to each hash unit is recorded in the content hash table (CHT) and stored on the information recording medium. A description will be given below of the manufacturing of an information recording medium having such a data recording structure and details of a data storage process.

as shown in FIG. 13, content to be stored on an information recording medium is edited by a content editing entity (AS: Authoring Studio) (=authoring facility) 330. Thereafter, for example, CDs, DVDs, Blu-ray discs, and the like are replicated in large numbers, and the information recording medium 100 is manufactured and provided to a user. The information recording medium 100 is reproduced in a device (information processing apparatus) 400 of the user.

A management center (TC: Trusted Center) (=license entity) 310 performs management for the entire processing of manufacturing, selling, and using discs. The management center (TC: Trusted Center) 310 provides, to the information recording medium manufacturing entity (DM: Disc Manufacturer) 350, various management information, for example, a media key Km that is set so as to correspond to a medium (information recording medium) and an MKB serving as an encrypted key block in which the media key Km is stored as encrypted data. On the basis of the management information received from the management center (TC: Trusted Center) 310, the information recording medium manufacturing entity (DM: Disc Manufacturer) 350 performs processes for editing and encrypting content received from the content editing entity (AS: Authoring Studio) 330, and processes for generating and storing the key information. Furthermore, the management center (TC: Trusted Center) 310 manages and provides a device key to be stored in the information processing apparatus 400 of the user A description will now be given, with reference to FIG. 14, of examples of processes to be performed by the management center 310, the content editing entity 330, and the information recording medium manufacturing entity 350.

Content 303 before editing is sent to the content editing entity 330. After an encoding process is performed on MPEG data or the like using an encoder and an editing process (step S11) is performed by the authoring system, a cutting master 331 is generated as the edited content.

When performing the editing process (step S11) (not shown) by the authoring system, copy limitation information corresponding to the content, CCI information (copy/play control information) that is reproduction limitation information, and recording seeds used to encrypt content are also generated. The recording seeds, as described above, can each be set for a CPS unit. When the edited content 331 has a plurality of content management units (CPS units), the recording seeds Vu are generated so as to have a number corresponding to the number of CPS units. The edited content 331 shown in the figure contains the CCI information and the recording seeds Vu, and the cutting master 331 as the edited content is sent to the information recording medium manufacturing entity 350.

The information recording medium manufacturing entity 350 obtains information (management information) necessary for encrypting content from the management center 310.

The management center 310 generates a media key Km 311, generates a media key block (MKB) 311 in which the media key Km 313 is stored as encrypted data, and provides, to the information recording medium manufacturing entity 350, a public key certificate (MF Key Certificate) 312 in which the medium key block (MKB) 311, the medium key Km 313, and the public key of the information recording medium manufacturing entity 350 are stored.

As described above, the MKB 312 has stored therein encrypted data that can be decrypted by only a decryption process using a device key stored in the reproduction apparatus that holds a license as a valid content use right. It is possible for only the reproduction apparatus holding a license as a valid content use right to obtain the media key Km.

the information recording medium manufacturing entity 350 receives the cutting master 331 as the edited content from the content editing entity 330, receives the medium key block (MKB) 311, the public key certificate (MF Key Certificate) 312, and the medium key Km 313 from the management center 310, and manufactures an information recording medium.

Initially, in step S21, an encryption process using the medium key 313 for the cutting master 331, and hash calculation are performed. The encryption process is performed as, for example, an encryption process in the CBC mode in accordance with the AES encryption algorithm described previously with reference to FIG. 7. The hash calculation is performed as the above-described hash value computation process in hash units and is performed as a process for creating a content hash table (CHT) in which computed values are recorded as comparison hash values. The content hash table (CHT) has a structure described previously with reference to FIGS. 11 and 12. As described previously, when content hash tables (CHT) in units of clips are recorded, a content hash table/clip file association table is generated together as necessary.

when the generation of the encrypted content and the content hash table (CHT) is completed, in step S22, a process for creating a disc image as recording data is performed. The disc image contains all the data to be recorded on the information recording medium (disc). In addition to the encrypted content and the content hash table, the medium key block (MKB) 311 and the public key certificate (MF Key Certificate) 312 are contained.

when the generation of the disc image is completed, in step S23, a process for modulating the disc image is performed, and modulated data as a recording signal is generated. A mastering process based on the modulated data in step S24 allows a stamper as a disc master to be produced. Furthermore, in step S25, replication is performed, thereby producing a large number of discs. After undergoing an inspection step in step S26, the discs are shipped in step S27.

Up to the mastering process in step S24, the encryption of content and the generation of the content hash table (CHT) can be performed in units of layers. The reason for this is that, as described previously with reference to FIGS. 10 and 11, the content hash table (CHT) has a structure that is independent of each layer. As a result of performing bit transfer using a stamper for each layer during the replication, a disc having a plurality of layers is created.

Next, a description will be given of details of a process for generating encrypted content and a content hash table (CHT), which is performed by the information recording medium manufacturing entity 350 in step S21. First, a description will be given, with reference to the flow in FIG. 15, of detailed sequences of a content encryption process and a disc image creation process involving the creation of a content hash table (CHT).

Initially, in step S101, an auxiliary information file (MST-BL.DAT) used to create a disc image is read. This auxiliary file is contained in the cutting master 331 as edited content that is received from the content editing entity 330.

a specific example of the auxiliary information file (MST-BL.DAT) for generating a disc image is shown in FIG. 16. A syntax that illustrates data, contained in the auxiliary information file (MSTBL.DAT) for creating a disc image, is shown in FIG. 17.

the auxiliary information file (MSTBL.DAT) for generating a disc image contains information necessary to generate a disc image from the cutting master 331. More specifically, the syntax is formed of the following information.

UD_START_Location: the physical sector number at the start point of user data (data zone) in each layer UD_END_Location: the physical sector number at the end point of User Data (Data Zone) in each layer CHT_Location: the physical sector number at the start point of the CHT CHT_Offset: the number of bytes from the start point of the CHT up to a point just before the hash value (data embedded by the mastering facility)

Content_Cert_Location: the physical sector number at the start point of the content certificate Content_Cert_Offset: the number of bytes from the start point of content certificate up to a point just before content ID (data embedded by the mastering facility)

UK_Inf_Location: the physical sector number at the start point of Unit_Key.inf (see P.2). When Unit_Key.inf is not recorded in the layer, 0000000016 is written.

UK_Inf_Offset: the number of bytes from the start point of Unit_Key.inf up to a point just before the encrypted unit key for CPS unit #1. When Unit_Key.inf is not recorded in the layer, 0000000016 is written.

Num_of_UK: the number of unit keys on the entire disc (=the number of CPS units)

MFK_Cert_Location: the physical sector number at the start point of the MF key certificate. The size is fixed. When MFK_Cert is not recorded in the layer, 0000000016 is written.

MKB_Location: the physical sector number at the start point of the MKB. When MKB_Cert is not recorded in the layer, 0000000016 is written.

N: the number of logical sectors in layer i

Encryption_Flag: flag indicating whether or not encryption should be performed

Data_Type: flag indicating the type of sector

CPS_Unit_No: the CPS unit number

Clip AV_File_No: the clip file number. Information used for generating a CHT

Last_Sector_of_Clip: the flag indicating the last sector of each clip (irrespective of layer)

Last_Sector_of_Layer: flag indicating the last sector in each layer the disc-image-generating auxiliary information file (MSTBL.DAT) contains information on the necessity/unnecessity of encryption in units of sectors, on encryption using which unit key (CPS unit key) should be performed, and the like. The information recording medium manufacturing entity 350 determines processing for each recording sector in accordance with the auxiliary information file (MSTBL.DAT).

Referring back to FIG. 15, a description of the process flow performed by the information recording medium manufacturing entity 350 is continued. In step S101, the auxiliary information file (MSTBL.DAT) is read. Then, in step S102, as initialization, a variable j=0 is set for the processing sector No.

in step S103, it is determined whether j< the number of all the sectors. When the determination of j< the number of all the sectors is Yes, the process proceeds to step S104, where user sector data(j) is read from the cutting master. In step S105, reference is made to the encryption flag of the user sector data(j), and the necessity/unnecessity of an encryption process is determined on the basis of the value of the encryption flag. As described in the auxiliary file shown in FIG. 16, when the encryption flag is [00], the sector is a sector that needs to be encrypted, and when the flag is [1], the sector is a sector that does not need to be encrypted.

Figure 18:
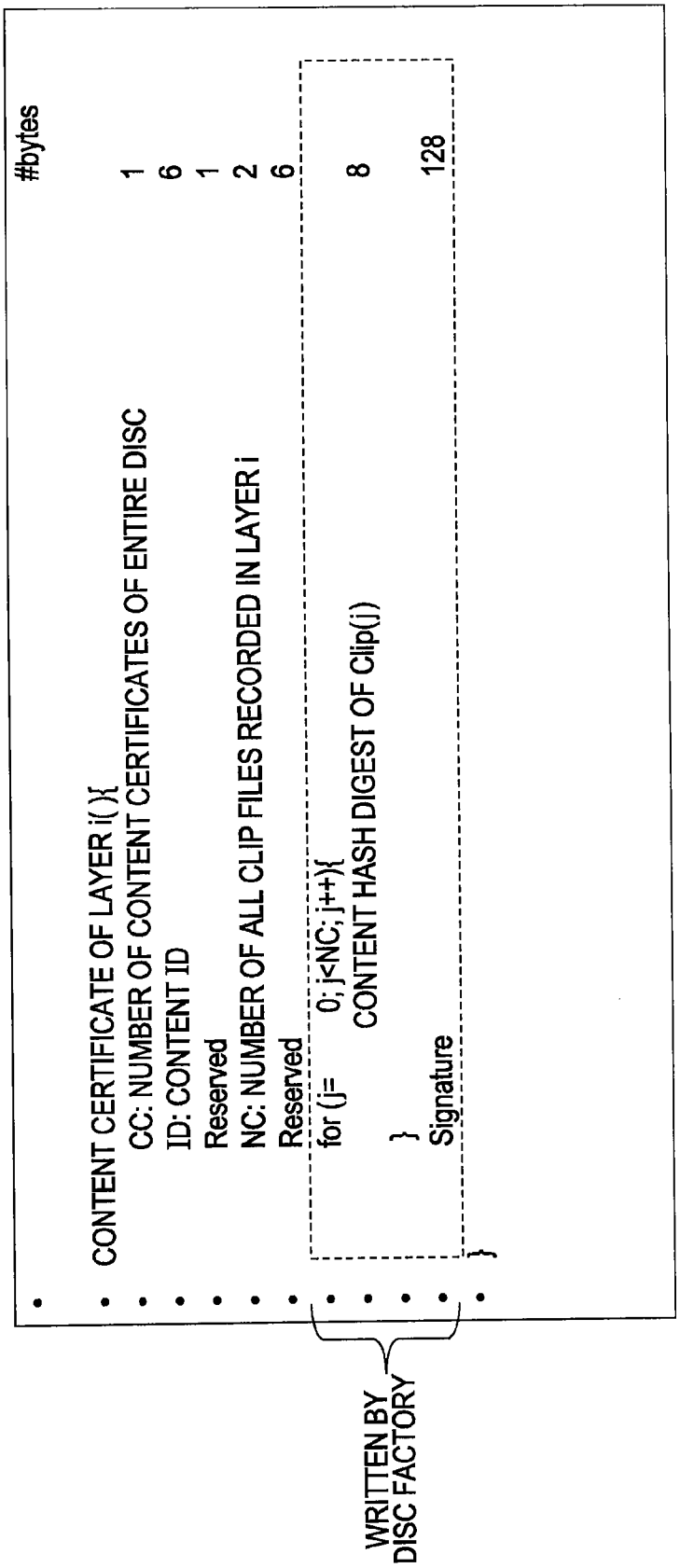
FIG. 18 illustrates the data structure.

When the encryption flag is not 0, the sector is determined to be a sector that needs to be encrypted, and the process proceeds to step S106. When encryption flag is 0, the sector is determined to be a sector that does not need to be encrypted, and the process proceeds to step S115. In step S106, the CPS unit No (j) corresponding to the processing sector is read. Next, in step S107, it is determined whether or not the data type corresponding to the processing sector is 1.

as described in the auxiliary file shown in FIG. 16, when the data type is [01], this indicates that the sector is a first sector of the aligned unit (AU). In this case, the process proceeds to step S108, where an initial value (IV) in the encryption process in the AES-CBC mode described previously with reference to FIG. 7 is obtained. For this initial value, for example, a value provided from the management center is used.

when it is determined in step S107 that the data type is not 1, this indicates that the sector is not a first sector of the aligned unit (AU). In this case, the process proceeds to step S109, where the encryption text unit of the previous sector (j−1) on which the process of the AES-CBC mode has been performed is obtained. Next, in step S110, an AES encryption process using a unit key is performed. These processes correspond to encryption processes in the AES-CBC mode described previously with reference to FIG. 7.

when one encryption text unit is generated, in step S111, the clip AV file No. For which processing has been performed is read. In step S112, the encryption unit (16 B) is stored in a buffer corresponding to the clip. In step S113, it is determined whether or not the data stored in the buffer has reached 192 bytes. When it has reached, in step S114, the hash value is computed. That is, each time 192 KB, which is the unit of the hash unit, is reached, the hash value is computed and is stored, in a memory, as a comparison hash value to be stored in the content hash table.

the foregoing processing is repeatedly performed in units of sectors by incrementing the sector No. In step S115. When processing is performed for all the sectors and the determination of j< the number of all the sectors? in step S103 becomes No, the process proceeds to step S121.

in step S121, a content hash table (CHT) in which comparison hash values computed in units of 192 hash units are generated are stored. The content hash table (CHT) has the structure described previously with reference to FIGS. 10 to 12.

in step S122, a content certificate is created. The structure of the content certificate will be described with reference to FIG. 18. The content certificate is a certificate for verifying that the content stored on the information recording medium is valid content. For example, one certificate is set in units of one layer and is stored on the information recording medium.

the content certificate contains the following information.

(a) CC: the number of content certificates of the entire information recording medium (b) ID: the content ID (c) NC: the number of all the clip files recorded in each layer (d) A content hash digest for each clip (e) A digital signature among them, (b) the content ID is identification data corresponding to the content and is a value supplied from the management center 310. (d) and (e) are data generated by the information recording medium manufacturing entity 350.

for the content hash digest, for example, values computed by the following computation process are recorded.

an example of a process for computing a content hash digest of clip(j)

for the hash value of clip(j) recorded in the content hash table in the layer i, for example, Hash Value (k)||Hash Value (k+1)|| . . . ||Hash Value (1−1)||Hash Value (1), a hash is calculated by, for example, SHA-1, and this computed value is set as a content hash digest of the clip(j). In the above formula, || indicates data concatenation.

the digital signature is a digital signature for data (CC to clip (NC−1)) recorded in the content certificate. For the signature key, a secret key (SK_MF) of the information recording medium manufacturing entity 350 is used. For a digital signature function, for example, RSA is used. The information processing apparatus that reproduces an information recording medium obtains a public key from the public key certificate of the information recording medium manufacturing entity 350, which is stored on the information recording medium, and checks the signature of the content certificate in order to check the presence or absence of data tampering, that is, check the authenticity of the content certificate.

when a content hash is to be calculated by the content editing entity (authoring facility), the content hash digest of the clip and the signature are written by the content editing entity (authoring facility).

Figure 19:
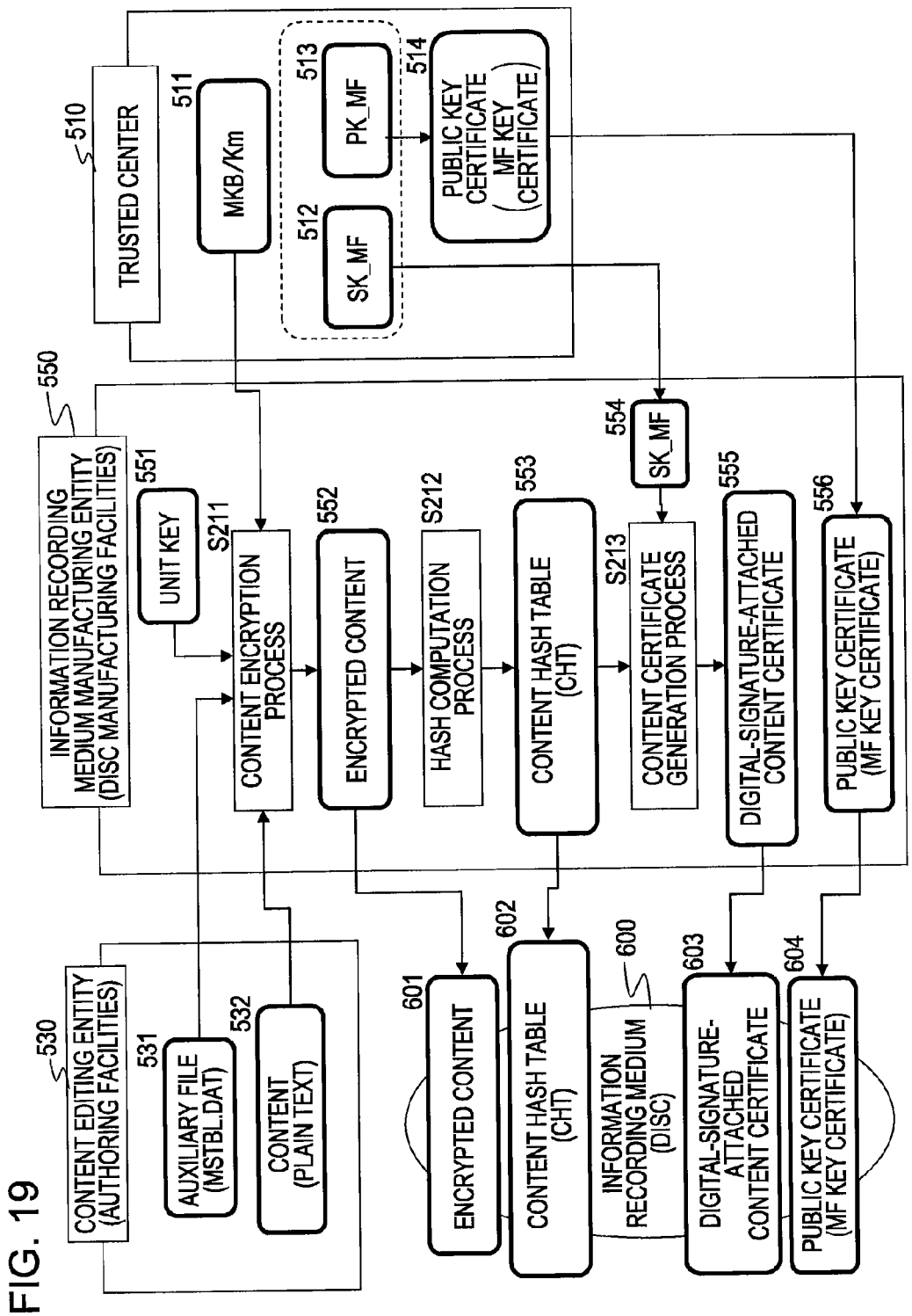
FIG. 19 illustrates examples of processing performed by the management center, the content editing entity, and the information recording medium manufacturing entity in the manufacturing of a content storage information recording medium.

A description will now be given, with reference to FIG. 19, of the flow of data in the manufacturing of an information recording medium having stored thereon encrypted content and other data and the whole of data processing. FIG. 19 shows a management center (TC: Trusted Center) (=license entity) 510, a content editing entity (AS: Authoring Studio) (=authoring facility) 530, an information recording medium manufacturing entity (DM: Disc Manufacturer) (=encryption facility) 550, and an information recording medium (disc) 600 that is finally manufactured.

the information recording medium manufacturing entity 550 obtains a medium key block (MKB) in which a medium key (Km) is stored from the management center 510, and obtains a medium key. Also, the information recording medium manufacturing entity 550 obtains plain-text content 532 and an auxiliary file (MSTB.DAT) 531 in which detailed information on an encryption process is described from the content editing entity 530, and furthermore performs a content encryption process (step S211) by using a unit key 551 in order to generate encrypted content 552. The content encryption process is performed as an encryption process in the AES-CBC mode (see FIG. 7), as processing in units of sectors as described previously with reference to FIG. 15. The generated encrypted content 552 is set as encrypted content 601 to be stored on an information recording medium 600.

Furthermore, in step S212, the information recording medium manufacturing entity 550 computes a hash value in units of predetermined data (hash units) of the generated encrypted content 552. This process corresponds to processes of steps S112 to S114 described previously with reference to FIG. 15 and is a process for computing a hash value in units of data of 192 KB, which is a data length of the hash unit. A content hash table 553 in which these hash values are recorded as comparison hash values is created and is set as a content hash table 602 to be stored on the information recording medium 600.

Furthermore, in step S213, the information recording medium manufacturing entity 550 performs a process for generating a content certificate. The content certificate is data for verifying the authenticity of the content, the content certificate having the data structure described previously with reference to FIG. 18. Herein, a content hash digest (see FIG. 18) based on the hash value stored in the content hash table 602 is stored, and furthermore a digital signature corresponding to the stored data is attached.

the management center 510 holds a secret key (SK_MF) 512 and a public key (PK_MF) 513 of the information recording medium manufacturing entity 550 and provides a public key certificate 514 in which the secret key 512 and the public key (PK_MF) 513 are stored to the information recording medium manufacturing entity 550.

the information recording medium manufacturing entity 550 attaches a digital signature to the content certificate by applying the secret key (SK_MF) 554 received from the management center 510, and generates a digital-signature-attached content certificate 555. This is set as a content certificate 603 to be stored on the information recording medium 600.

Furthermore, the information recording medium manufacturing entity 550 records the public key certificate 556 received from the management center 510 on the information recording medium. This becomes a public key certificate 604 to be stored on the information recording medium 600.

the example of processing in FIG. 19 is an example of processing in accordance with the process flow of FIG. 15. However, the role sharing of each entity is not limited to the example of processing shown in FIGS. 15 and 19. Examples of the other processes will be described with reference to FIGS. 20 and 21.

Figure 20:
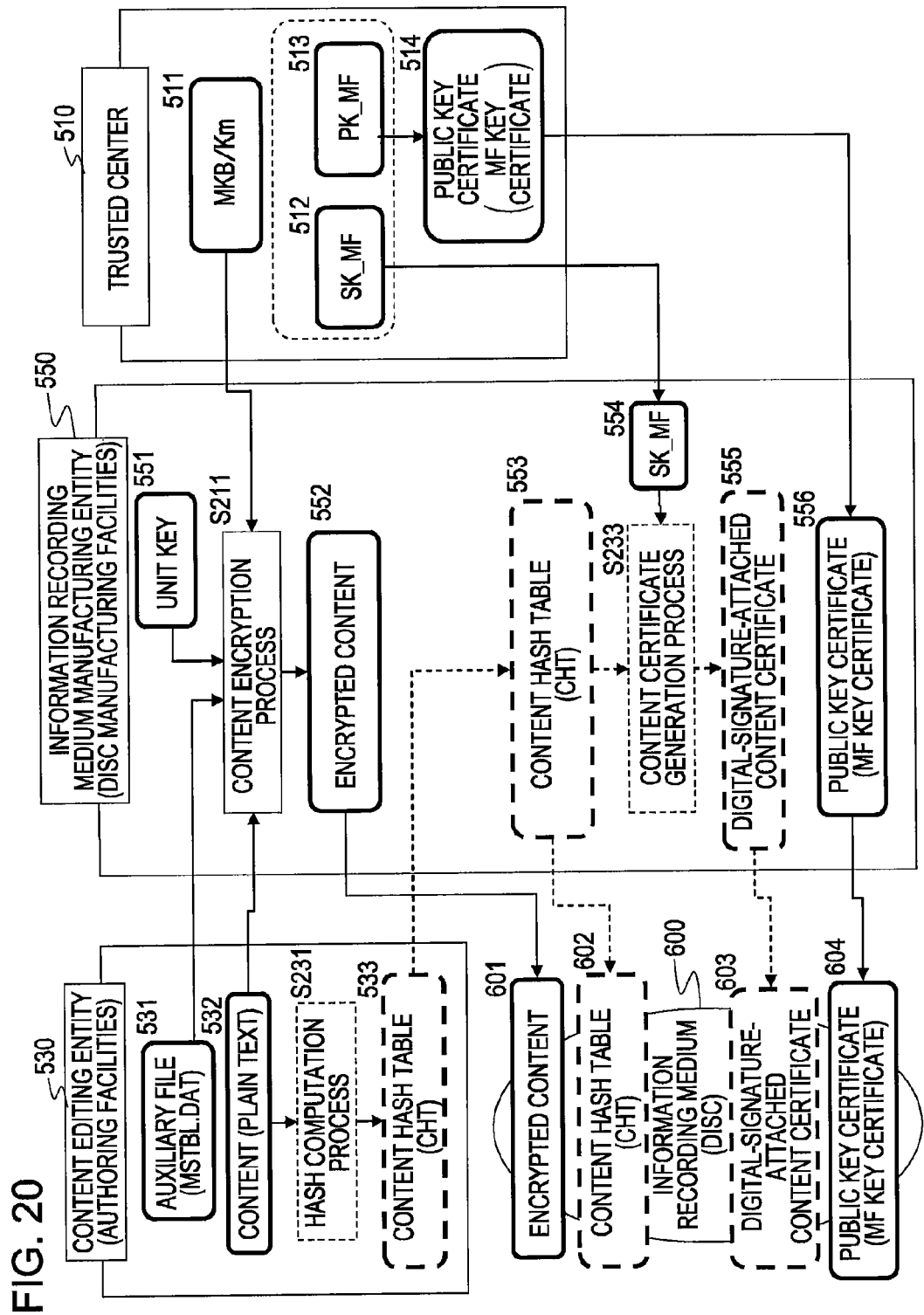
FIG. 20 illustrates examples of processing performed by the management center, the content editing entity, and the information recording medium manufacturing entity in the manufacturing of a content storage information recording medium.

FIG. 20 shows an example of processing in which the content editing entity (AS: Authoring Studio) (=authoring facility) 530 performs a hash value computation process and a content hash table (CHT) creation process. The structure of the dotted-line part shown in FIG. 20 differs from the example of processing shown in FIG. 19.

in step S231, on the basis of the plain-text content 532, the content editing entity 530 extracts a hash unit, computes a hash value for each hash unit, and creates a content hash table (CHT) 533 in which these are recorded. In this case, the hash value is determined for each hash unit that is set in units of the predetermined data length of plain text data.

the content hash table (CHT) 533 is provided to the information recording medium manufacturing entity 550. On the basis of the hash value stored in the content hash table (CHT) 553, the information recording medium manufacturing entity 550 computes a content hash digest (see FIG. 18), stores the computed content hash digest in the content certificate, generates a digital signature corresponding to the stored data, and generates a digital-signature-attached content certificate 555. This is set as the content certificate 603 to be stored on the information recording medium 600.

in this example of processing, the computation of a content hash based on the plain-text content, and the creation of the content hash table are performed by the content editing entity 530. The processes for generating a content certificate and for attaching a digital signature are performed by the information recording medium manufacturing entity 550.

Figure 21:
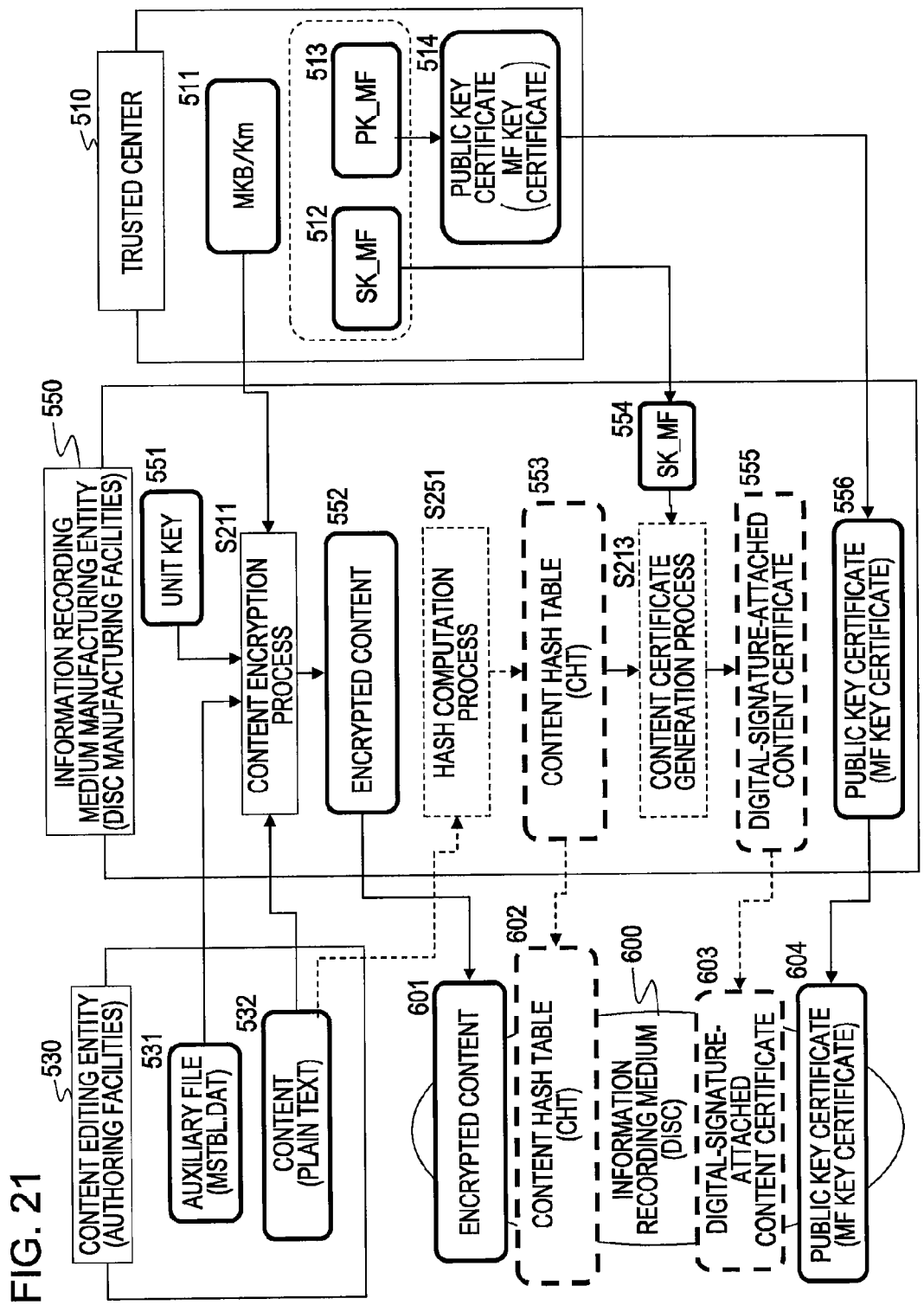
FIG. 21 illustrates examples of processing performed by the management center, the content editing entity, and the information recording medium manufacturing entity in the manufacturing of a content storage information recording medium.

Next, a description will be given, with reference to FIG. 21, of examples of processes in which the information recording medium manufacturing entity 550 computes a content hash on the basis of plain-text content and creates a content hash table. The structure of the dotted-line part shown in FIG. 21 differs from the example of processing shown in FIG. 19.

in step S551 shown in FIG. 21, on the basis of the plain-text content received from the content editing entity 530, the information recording medium manufacturing entity 550 extracts a hash unit, computes a hash value for each hash unit, and creates a content hash table (CHT) 553 in which these are recorded. In this case, the hash value is determined for each hash unit that is set in units of the predetermined data length of the plain text data.

on the basis of the hash value stored in the content hash table (CHT) 553, the information recording medium manufacturing entity 550 computes a content hash digest (see FIG. 18), stores the computed content hash digest in the content certificate, generates a digital signature corresponding to the stored data, and creates a digital-signature-attached content certificate 555. This is set as the content certificate 603 to be stored on the information recording medium 600.

in this example of processing, the computation of the content hash based on plain-text content and the creation of the content hash table are performed by the information recording medium manufacturing entity 550.

Furthermore, in this example of processing, for example, all of the computation of a content hash based on plain-text content, the creation of a content hash table, the creation of a content certificate, and a signing process may be performed by the content editing entity. As described above, the computation of a content hash based on plain-text content, the creation of a content hash table, the creation of a content certificate, and a signing process can be performed by not only the information recording medium manufacturing entity 550, but also by one of the content editing entity 530 and the information recording medium manufacturing entity 550.

[5. Verification Process Using Content Hash in Content Reproduction Process]

Next, a description will be given of a verification process using a content hash in a content reproduction process.

A description will now be given, with reference to FIGS. 22 to 24, of a content verification process based on a hash value, which is performed by the information processing apparatus (reproduction apparatus) for reproducing content from an information recording medium.

the information processing apparatus that performs a content reproduction process from an information recording medium includes content verification means for verifying the authenticity of content and content reproduction means for performing a process for reproducing content under the condition in which the authenticity of content has been confirmed on the basis of verification by the content verification means. The content verification means is configured to select n hash units (n is an integer of 1 or more) that are set as subdivided data of content recorded on the information recording medium, performs a process for comparing the computed hash value based on the selected hash unit with a comparison hash value stored on the information recording medium, and performs a content verification process under the condition in which the comparison of all of the n selected hash values holds.

Figure 22:
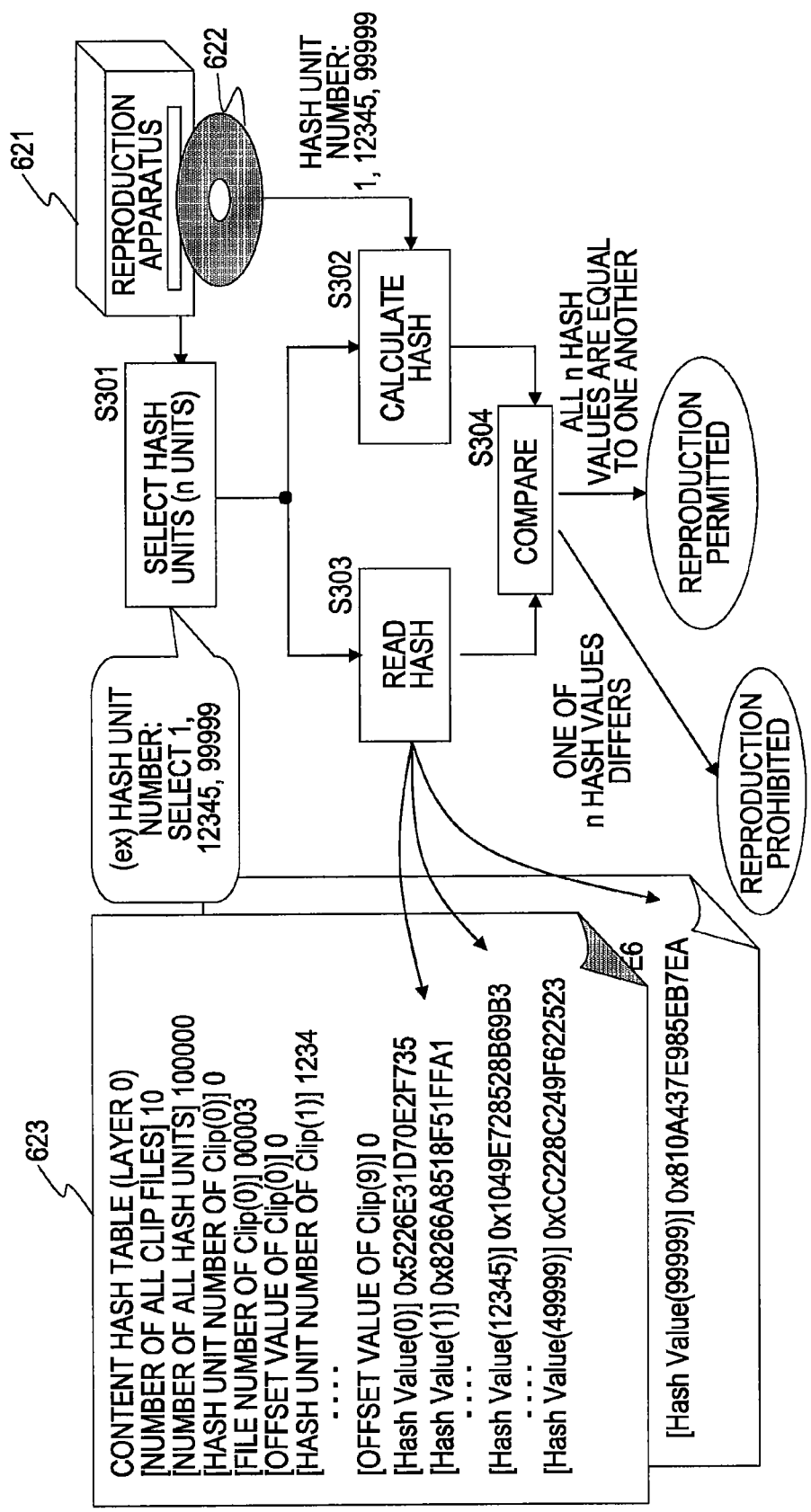
FIG. 22 illustrates a content verification processing sequence based on a hash value in an information processing apparatus for reproducing content.

FIG. 22 shows the outline of processing performed by the content verification means in the information processing apparatus (reproduction apparatus). An information processing apparatus (reproduction apparatus) 621 has installed therein an information recording medium 622 on which content is recorded. Prior to reproducing content, the information processing apparatus 621 selects a hash unit corresponding to content to be reproduced and performs comparison of the hash value that is set in the hash unit.

Initially, in step S301, a hash unit for which a comparison process is performed is selected. As is clear from the above description, the stored content of the information recording medium has been divided into hash units of a predetermined data length (for example, 192 KB). The information processing apparatus 621 selects, from a large number of these hash units, a unit for which a comparison process is performed. Details of the unit selection process will be described in detail later with reference to FIG. 24. For a hash unit to be selected for the object of the comparison process, plural (n), for example, three hash units, are randomly selected.

the selected hash units are assumed to be the following:
hash unit #1,
hash unit #12345, and
hash unit #99999.

in step S302, data corresponding to the selected hash units is read from the information recording medium 622, and a hash value for each selected hash unit is computed.

The computed hash values are assumed to be the following:
the hash value of hash unit #1=aaa,
the hash value of hash unit #12345=bbb, and
the hash value of hash unit #99999=ccc.

On the other hand, in step S303, a comparison hash value of the content hash unit for which a comparison process is performed, the content hash unit being selected in step S301, is read from the content hash table 623 stored on the information recording medium 622. The read comparison hash values are assumed to be the following:
the hash value of the hash unit #1=AAA,
the hash value of the hash unit #12345=BBB, and
the hash value of the hash unit #99999=CCC.

in step S304, a process is performed for comparing the hash value computed on the basis of the hash unit of the content in step S302 with the comparison hash value read from the content hash table (CHT). When the computed hash values of all the corresponding hash units match the comparison hash values, that is, when the following holds:
aaa=AAA,
bbb=BBB, and
ccc=CCC,
it is determined that the content has not been tampered with, content reproduction is permitted, and the process proceeds to a content reproduction process.

On the other hand, when any mismatch between the computed hash values of the corresponding hash units and the comparison hash values is detected, that is, when one of the following is detected:
aaa≠AAA,
bbb≠BBB, or
ccc≠CCC,
it is determined that the content has been tampered with, content reproduction is prohibited, and a shift to the subsequent content reproduction process is stopped.

Figure 23:
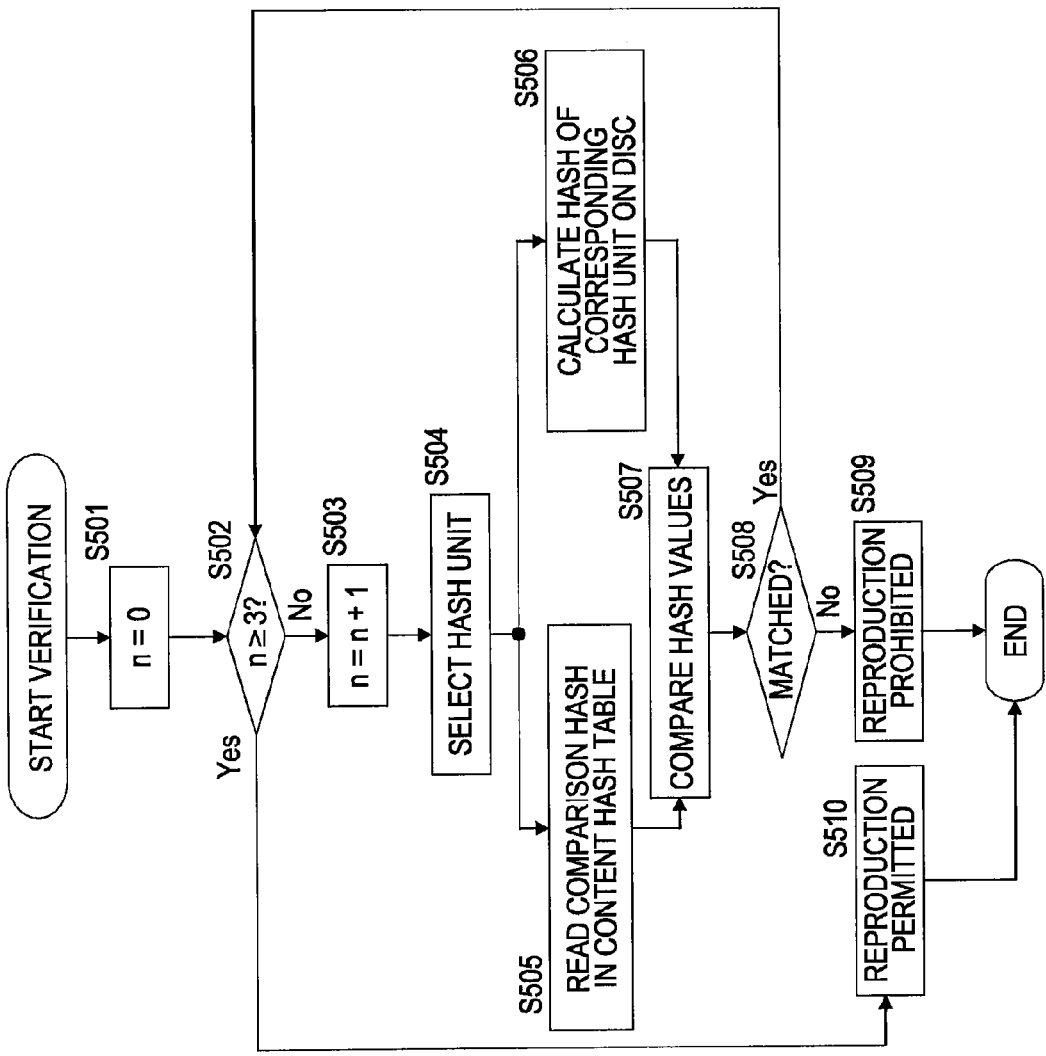
FIG. 23 is a flowchart illustrating a content verification process sequence based on a hash value in the information processing apparatus for reproducing content.
Figure 24:
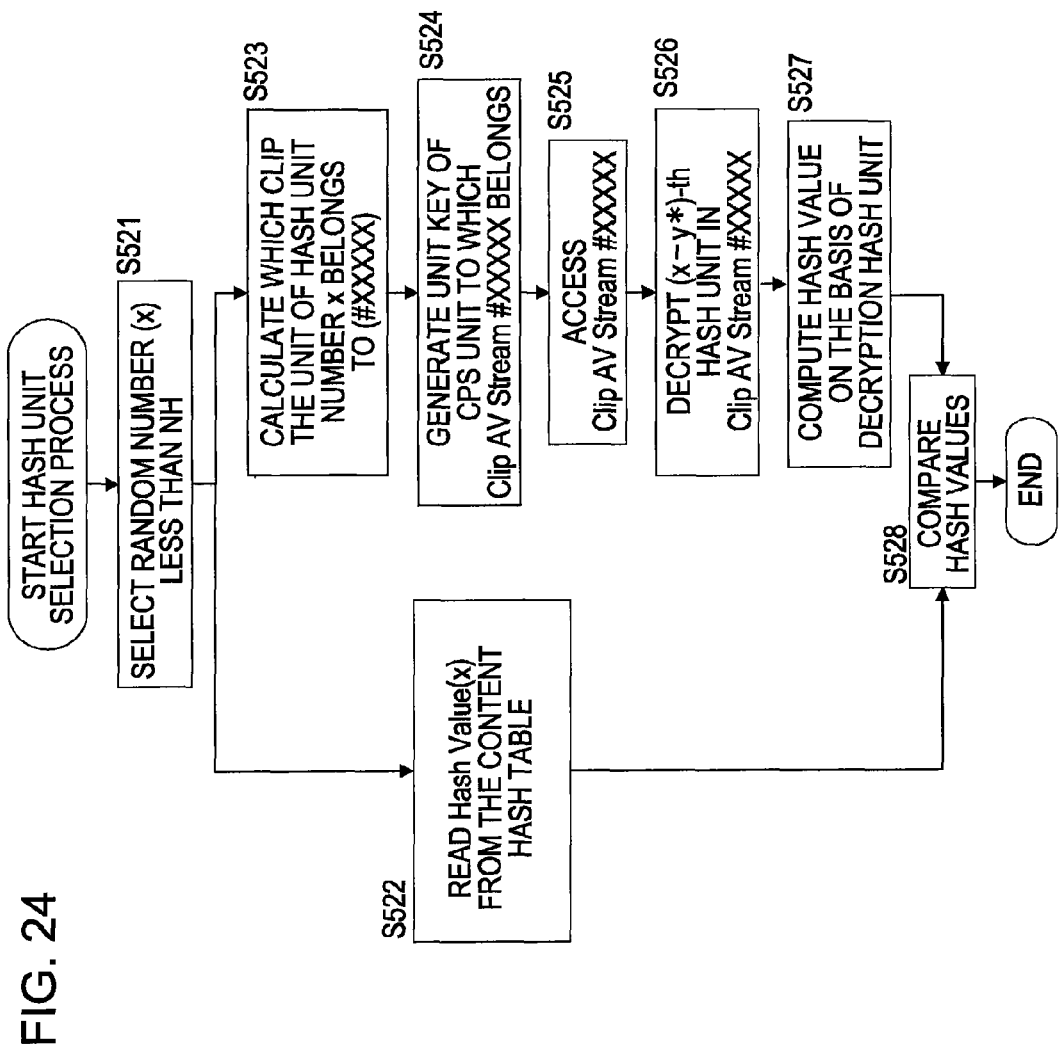
FIG. 24 illustrates a content verification process sequence using a hash value based on plain text data in the information processing apparatus for reproducing content.

Next, a description will be given in detail, with reference to the flows in FIGS. 23 and 24, of a procedure for verifying a content hash in the information processing apparatus for reproducing content.

the process flow of FIG. 23 shows an example of setting the number n of hash units for which a comparison process is performed, that is, n=3.

in step S501, the information processing apparatus that compares the hash values sets, as initialization, the initial value n of the number of hash units for which a comparison process is performed, that is, n=0. In step S502, it is determined whether or not n≧3. If not n≧3, since a specified number of comparisons (n=3) is not reached, the comparison process of step S503 and subsequent steps are performed.

after setting n=n+1 in step S503, in step S504, a hash unit is selected on the basis of the hash unit number. The selection of the hash unit is randomly performed.

More specifically, [the number (NH) of all the hash units] recorded in the content hash table (CHT) is read, and a random number of (x) x<NH is selected. This selected numerical value (x) is set as a hash unit number #x for which a comparison process is performed.

in step S505, the comparison hash value of the hash unit number #x is obtained from the content hash table stored on the information recording medium. In step S506, the hash unit of the hash unit number #x is extracted from the hash units of the content stored on the information recording medium, and a hash value is computed on the basis of the extracted hash unit. In step S507, a process for comparing the computed hash value with the comparison hash value is performed.

in step S508, a determination is made as to whether the computed hash value matches the comparison hash value. If they match, the process returns to step S502, where it is determined whether n≧3. When a specified number of comparisons (n=3) is not reached, in step S503, n is updated. Thereafter, in step S504, a new hash unit is selected. In the subsequent steps S505 to S507, an identical process for comparing the computed hash value with the comparison hash value is performed with respect to a different hash unit. When this process is repeatedly performed a specified number of times and the matching of all the hash values has been confirmed for a specified number of times (n=3), in step S502, the determination of n≧3? becomes Yes. In step S510, reproduction is permitted, and the process proceeds to a reproduction process.

during the hash value verification process of a specified number n of times, when a match is not confirmed in the determination of matching between the computed hash value and the comparison hash value in step S508, the process proceeds to step S509, where reproduction is prohibited, and the process does not proceed to a content reproduction process.

when a hash value with which a comparison is made has been set in encrypted content, as in the above-described process, a hash value can be directly computed from the hash unit corresponding to the encrypted content read from the information recording medium. However, when a hash value has been computed with respect to plain text and it has been recorded as a comparison hash value in the content hash table (CHT) as described previously, the computation hash value also needs to be computed on the basis of plain text.

A description will now be given, with reference to FIG. 24, of a processing procedure for performing verification using a hash value based on plain text. The processes shown in FIG. 24 correspond to processes of steps S504 to S507 shown in FIG. 23. After the processes of steps S501 to S503 are performed, in step S521 of FIG. 24, [the number (NH) of all the hash units] recorded in the content hash table (CHT) is read, and a random number of x<NH is selected.

in step S522, the comparison hash value (x) of the hash unit number #x is obtained from the content hash table stored on the information recording medium. In step S523, a calculation is performed as to which clip the unit of the hash unit number #x belongs to.

as described above, in the content hash table (CHT), following the number (NC) of all the clips and the number (NH) of all the hash units, each data of the following is recorded with respect to each clip(i):

the start hash unit number of clip(i), the number corresponding to the file name of clip(i), and the offset value of clip(i).

Furthermore, [Hash Value] as a hash value (comparison hash value) for each hash unit is recorded for each clip.

on the basis of the recording data of the content hash table, a clip belonging to the content management unit is computed on the basis of the hash unit number. Next, in step S524, the unit key of the content management unit (CPS unit) to which the clip AV stream belongs is generated. As described previously with reference to FIGS. 2 and 3, each clip belongs to one of the content management units (CPS units), each content management unit (CPS unit) is associated with a unit key, and encryption is performed using the unit key. In step S524, this unit key is generated. The process for generating the unit key will be described later.

Next, in step S525, access is made to the clip AV stream. In step S526, the hash unit #x contained in the clip AV stream is obtained, and a decryption process is performed. In step S527, a hash value is computed on the basis of the decrypted data of the hash unit #x.

in step S528, it is determined whether the computed hash value matches the comparison hash value. If they match, identical processing is performed on another hash unit. A comparison process is repeatedly performed until a specified number of times (for example, n=3) is reached. When the matching of all the hash values is confirmed for a specified number (n) of times, reproduction is permitted, and the process proceeds to a reproduction process. During the hash value comparison process of a specified number n of times, if a mismatch appears, the reproduction is prohibited at that point in time, and the process does not proceed to a content reproduction process.

[6. Generation of Unit Key, Content Decryption, and Reproduction Process]

Next, a description will be given of the generation of a unit key, content decryption, and a reproduction process in the information processing apparatus (reproduction apparatus) for reproducing content. The unit key is used when content is to be decrypted and reproduced. As described above, when a hash value has been set in decrypted data (plain text), it is necessary to generate the unit key also during the verification process based on the hash value and to decrypt the hash unit. A description will now be given, with reference to FIGS. 25 and 26, of details of the generation of a unit key, content decryption, and a reproduction process.

First, a description will be given, with reference to FIG. 25, of the generation of a unit key and a content decryption process performed by the content verification means and the content reproduction means of the information processing apparatus, and a content reproduction process performed by the content reproduction means. The information processing apparatus (reproduction apparatus) that performs the generation of the unit key, content decryption and a reproduction process reads a device key 776 stored in a memory. The device key 776 is a secret key stored in the information processing apparatus under a license on use of content.

Next, in step S601, by using the device key 776, a process is performed for decrypting an MKB 781, which is an encrypted key block in which a medium key Km stored on an information recording medium 780 is stored, and the medium key Km is obtained.

The MKB 781 is a key information block in which a media key (Km) that is a key necessary for decrypting content can be obtained by only a process (decryption) based on a device key stored in an information processing apparatus of a user having a valid license. This is such that, as described above, the information distribution method in accordance with a so-called hierarchical tree structure enables a key to be obtained only when the user device (information processing apparatus) has a valid license, and can prevent a key (media key) of the user device that has been nullified (revoked) from being obtained. As a result of changing the key information to be stored in the MKB, it is possible for the management center to generate an MKB having a structure in which content cannot be decrypted using a device key stored in a specific user device, that is, a media key necessary for decrypting content cannot be obtained. Therefore, it is possible to revoke an unauthorized device at any timing and possible to provide encrypted content that can be decrypted to only a device having a valid license.

Next, in step S602, an encryption process (AES_GD) based on a medium key Km obtained in an MKB process in step S601 and a physical index 782 read from an information recording medium 780 allows a unit-key-generation key Ke (embedded Key) to be generated. This key generation process is performed as, for example, a process in accordance with an AES encryption algorithm. In FIG. 25, AES_D indicates a data decryption process using an AES encryption process, AES_GD indicates a key generation process involving a data decryption process using the AES encryption process, and AES_GE indicates a key generation process involving a data encryption process using the AES encryption process.

Next, in step S603, a control key Kc is generated by the encryption process (AES_GD) based on a unit-key-generation key Ke (embedded Key) and content use control information (copy/play control information (CCI)) 783 read from the information recording medium 780. In step S604, a content hash key Kh is generated by the encryption process (AES_GD) based on the control key Kc and a content hash 784 read from the information recording medium 780. The content hash 784 is a hash value based on content stored on the information recording medium or data forming encrypted content.

Next, in step S605, an encrypted unit key Enc(Ku) 785 read from the information recording medium 780 is decrypted (AES_D) by using the content hash key Kh, and a unit key Ku is obtained. In this example, the unit key to be stored on the information recording medium 780 is stored as encrypted data using the content hash key Kh generated by processes identical to steps S601 to S604 of FIG. 25.

The encrypted unit key Enc(Ku) 785 recorded on the information recording medium 780 is defined for each CPS unit. The unit key Ku generated in S605 is also similarly defined for each CPS unit. The CPS unit key to be generated is a CPS unit key Ku(i) that is set so as to correspond to the CPS unit corresponding to the content to be reproduced, that is, a CPS unit(i) selected from the CPS units 1 to n stored on the information recording medium 780.

When decrypting the encrypted content, first, in S606, a block seed is extracted from encrypted content 406 read from the information recording medium 780, and data for the decryption processing part (encrypted data) requiring a decryption process and a non-decryption processing part (plain text data) not requiring a decryption process is selected.

The block seed is encrypted key generation information that is set so as to correspond to a block serving as an encryption processing unit. Content data serving as a CPS unit is encrypted using a block key Kb different in block units of a predetermined data length. For decryption, a block key Kb serving as a decryption processing key for each block is generated by an encryption process (S607: AES_GE) on the basis of a block seed that is set so as to correspond to each block data and the CPS unit key Ku. Then, a decryption process (S608) is performed using the generated block key Kb.

The block key Kb is a key used to decrypt encrypted content in encryption processing units of a specific size. The size of the encryption processing unit is assumed to contain, for example, user data of 6144 bytes or user data of 2048 bytes.

Step S609 is a process for coupling together unencrypted data of, for example, a block seed part contained in the encrypted content, and data decrypted in step S608. As a result, decrypted content (CPS unit) 777 is output.

Specific examples of an encryption process to be performed in steps S602 to S605, and S607 will be described with reference to FIG. 26. In FIG. 26, an AES decryptor (AES_D) 791 is, for example, a decryption processor based on an AES or ECB mode having a key length of 128 bits. An AES encryption part (AES_E) 793 is, for example, an encryption processor based on an AES or ECB mode having a key length of 128 bits. An exclusive OR section 792 represents a computation section for performing an exclusive OR (XOR) process between two bit strings having the same length More specifically, as shown in FIG. 26(*a*), the process (AES_GD) for generating a unit-key-generation key Ke in step S602 of FIG. 25 is performed as a process for inputting the physical index stored on the information recording medium 780 to the AES decryptor 791, for performing decryption using the media key Km obtained from the MKB by applying an AES (Advanced Encryption Standard) encryption algorithm, which is a common key encryption method, and for setting, as a unit-key-generation key Ke, the value obtained by inputting the output value of the decryptor 791 and the physical index data to an exclusive OR section 792 and by performing an exclusive OR operation.

Figure 25:
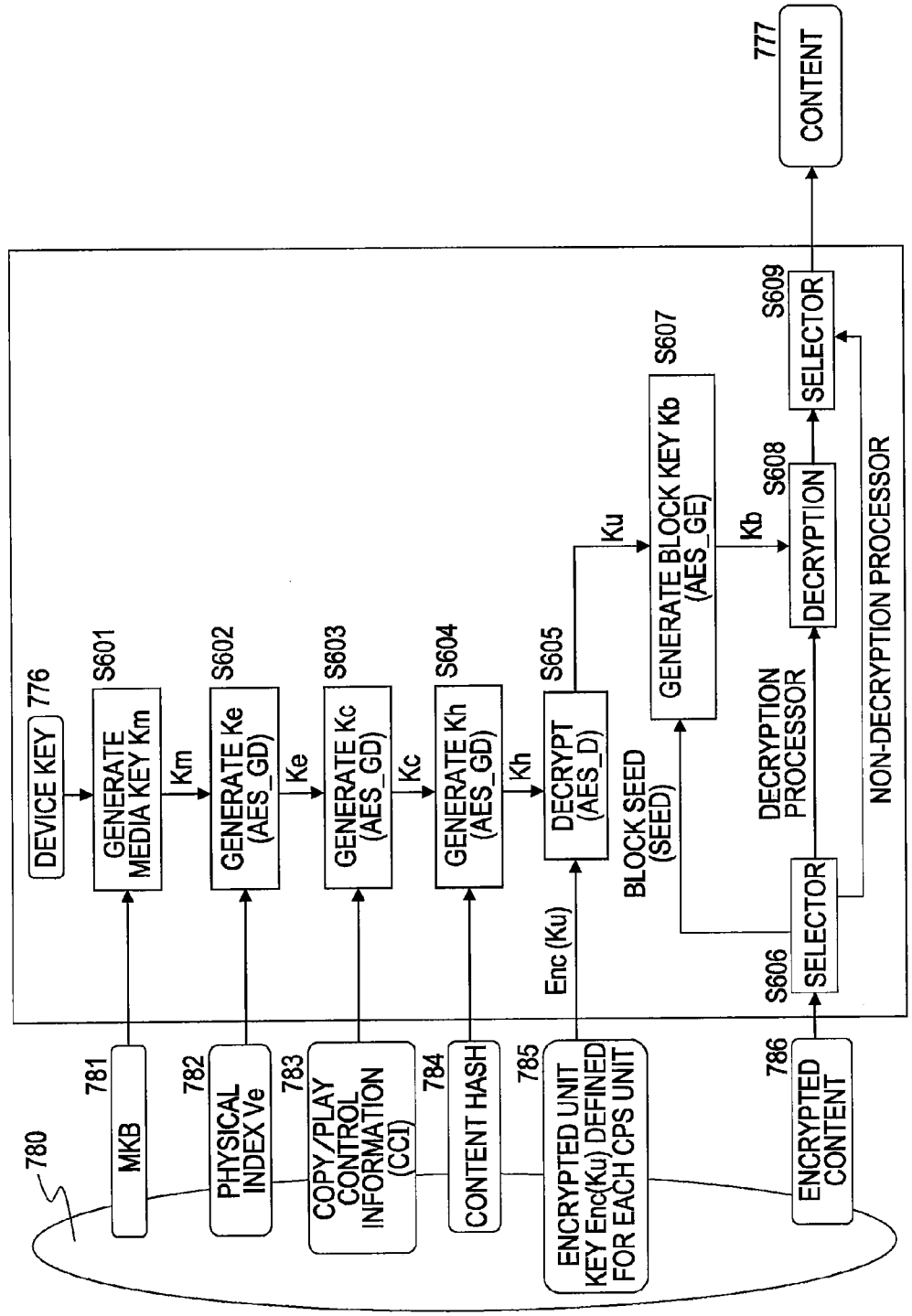
FIG. 25 illustrates an encryption process sequence in content reproduction by the information processing apparatus.
Figure 26:
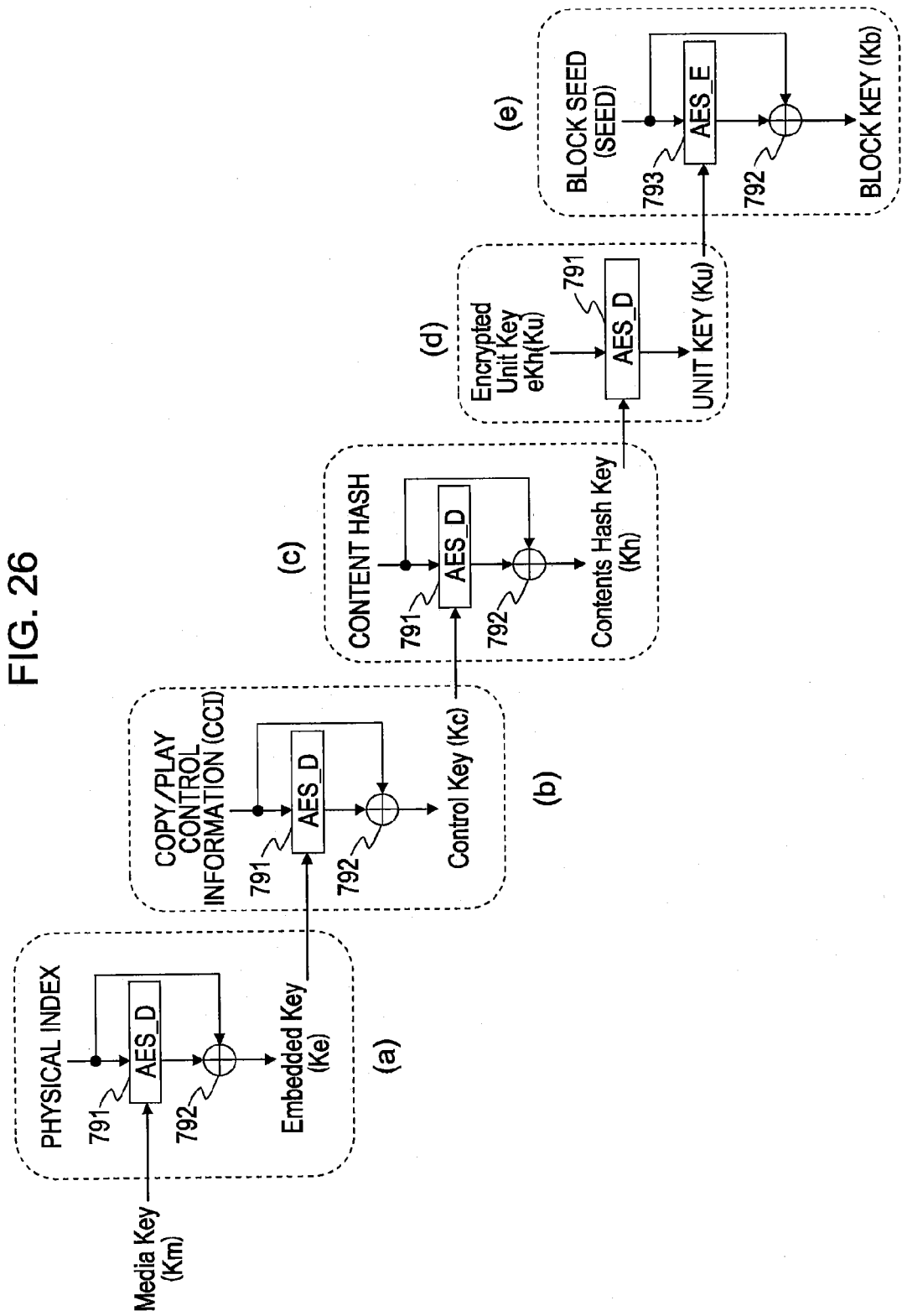
FIG. 26 illustrates details of encryption processing, such as key generation, which is applied in content reproduction by the information processing apparatus.

The generation of the control key Kc in step S603 of FIG. 25 and X the generation of the content hash key in step S604 are performed by operations by the AES decryptor 791 and the exclusive OR section 792, as shown in FIGS. 26(*b*) and 26(*c*). As shown in FIG. 26(*d*), the generation of the unit key Ku is performed as a process in which the AES decryptor 791 decrypts the encrypted unit key eKh(Ku) obtained from the information recording medium 780 by using the content hash key Kh. The generation of the block key Kb in step S607 of FIG. 26 is performed by computation by an AES decryptor 793 and the exclusive OR section 792, as shown in FIG. 26(*e*).

In this embodiment, an example is shown in which, by using an AES encryption algorithm key, data having a key length of 128 bits is generated. However, the algorithm and the key length are not limited to these examples, and another algorithm and another key length can also be used.

as described above, a unit key used for a process for decrypting content (CPS unit) is generated by using various kinds of information. When hash value verification is performed on the basis of plain text data, a process for decrypting a hash unit selected in accordance with the process described with reference to FIG. 25 is performed. Thereafter, a hash value based on the decrypted data is computed, and the computed hash value is compared with the comparison hash value stored in the content hash table (CHT).

[7. Details of Medium Key Block (MKB) and Recording Process Thereof]

Next, a description will be given of details of a medium key block (MKB) recorded as an encrypted key block on an information recording medium and the recording process thereof.

as described above, the media key block (MKB) is a key information block in which a media key (Km) that is a key necessary for decrypting content can be obtained by only a process (decryption) based on a device key stored in an information processing apparatus of a user having a valid license. The information distribution method in accordance with a hierarchical tree structure enables a key media key (Km) to be obtained only when the user device (information processing apparatus) has a valid license.

the medium key block (MKB) is capable of preventing a media key to be obtained because a decryption process becomes not possible using the device key for which an updating process for changing the valid content is performed as necessary by the management center and that is stored in the user device that has been nullified (revoked). In the manner described above, as a result of changing the key information to be stored in the MKB, it is possible for the management center to generate an MKB having a structure in which content cannot be decrypted using a device key stored in a specific user device, that is, a media key necessary for decrypting content cannot be obtained. Therefore, it is possible to revoke an unauthorized device at any timing and possible to provide encrypted content that can be decrypted to only a device having a valid license.

A description will now be given, with reference to FIG. 27, of processes for a medium key block (MKB), which are performed by the information processing apparatus for reproducing content. As described previously with reference to FIG. 25, it is necessary to use a medium key block when the generation of the unit key, content decryption, and reproduction are performed.

Figure 27:
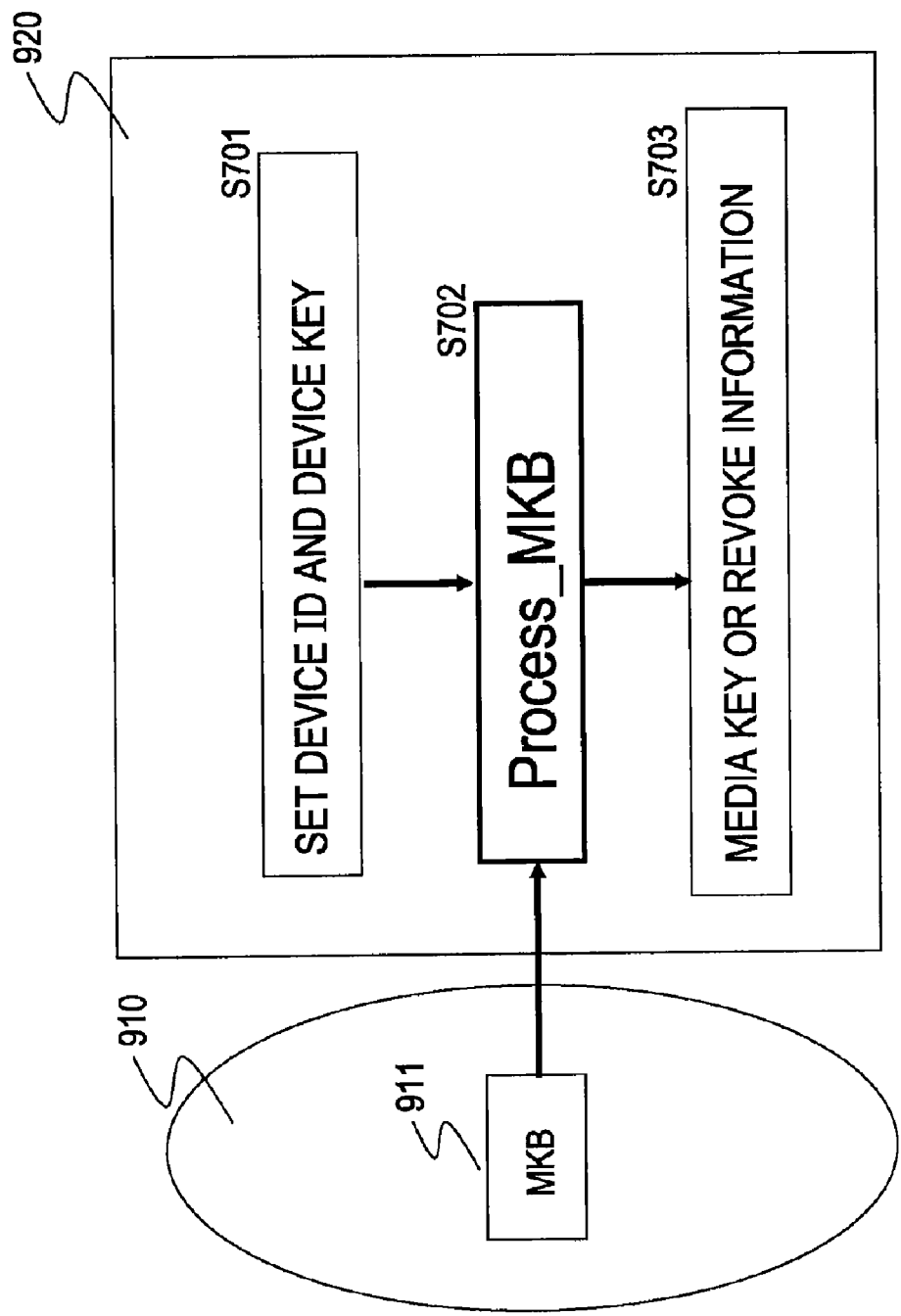
FIG. 27 illustrates processing for a medium key block (MKB) in the information processing apparatus for reproducing content.

FIG. 27 shows an information recording medium 910 on which a medium key block (MKB) 911 is stored, and steps S701 to S703 as processes of an information processing apparatus 920 that reads the medium key block (MKB) 911 from the information recording medium 910 and that performs processing.

as described above, the information processing apparatus 920 reads the medium key block (MKB) 911 from the information recording medium 910 when the generation of the unit key, content decryption, and reproduction are performed. In step S701, the information processing apparatus 920 obtains a device key stored in the memory of the information processing apparatus 920, or a device key and a device ID. In step S702, the information processing apparatus 920 performs a process for decrypting encrypted data contained in the medium key block (MKB) 911 by using the obtained device key or by using the device key and the device ID.

when the process for decrypting encrypted data contained in the medium key block (MKB) 911 succeeds, in step S703, predetermined key data, that is, the medium key (Km), can be obtained. When the process fails and an invalid data string differing from the predetermined key data, that is, the medium key (Km), is obtained, the information processing apparatus is determined to be a device that has been revoked or nullified.

in step S701, the device ID to be used is, for example, 50-bit Y data and is a value that is set as a value specific to all reproduction devices, recording devices, drives for a PC, and applications that use a copy protection system under the management of, for example, a management center. The device key is, for example, 128-bit data and is key data provided to a group of one or more devices. One device can have a plurality of device keys.

the medium key (Km) obtained on the basis of the processing of the medium key block (MKB) is, for example, 128-bit data and is key data that is changed for each medium such as an information recording medium or for each content and that is set. The media key is stored as encrypted data using a valid device key in the medium key block (MKB). For the encryption algorithm, for example, an AES encryption algorithm is used.

Figure 28:
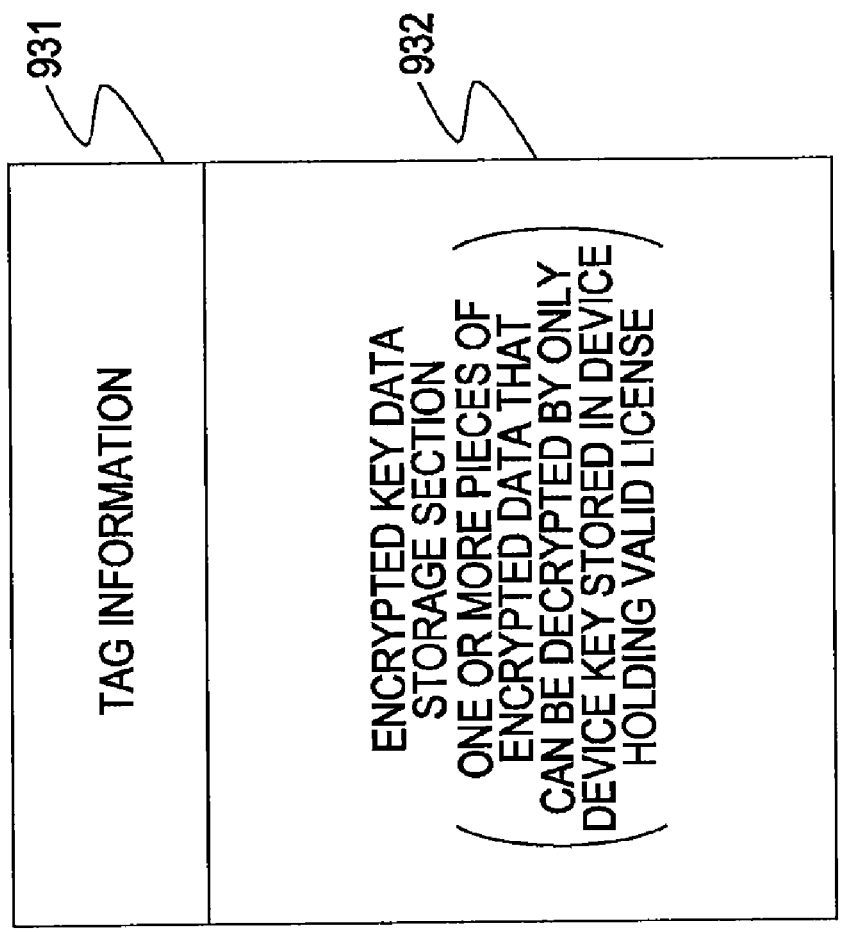
FIG. 28 illustrates the data structure of the medium key block (MKB).

A medium key (Km) of the same value for one or more device keys is encrypted in the medium key block (MKB) so that a correct medium key (Km) can be obtained in all valid devices. However, in order that the device that performed an illegal act cannot obtain a correct medium key (Km), encrypted data using a device key possessed by the unauthorized device is not contained in the medium key block (MKB). The management center updates the MKB as appropriate and performs a process for deleting the device key of the revoked device from the encrypted key. As a result, when processing of the MKB is performed by the revoked device, information that "the device has been revoked" rather than the key data of the medium key (Km) is received.

the data structure of the medium key block (MKB) will be described with reference to FIGS. 28 and 29. As shown in FIG. 28, the MKB is formed of tag information 931 and an encrypted key data storage section 932. In the encrypted key data storage section 932, one or more pieces of encrypted data are stored, which can be decrypted by only a process using a device key stored in the device (device) holding a valid license, more specifically, a device key formed of a set of keys that are set in such a manner as to correspond to nodes and leaves contained in a hierarchical tree structure. The hierarchical tree structure is, for example, a two-branch tree structure in which the apex node is a root, and each device is made to correspond to a leaf in the bottommost layer one by one. To each device, the corresponding key of the node in the path from the leaf to the root is provided as a device key.

in the encrypted key data storage section 932, transmission data encrypted using various node keys is stored. The node key to be used enables a device with which a decryption process is possible to be freely set.

the tag information 931 is data that indicates the sequence of one or more pieces of encrypted data (a bunch of keys) contained in the encrypted key data storage section 932 and that is used to select encrypted data that can be decrypted by each device. By recording this MKB that is an encrypted key block on an information recording medium and by providing it to each device, only a device holding a valid license can obtain a medium key.

Figure 29:
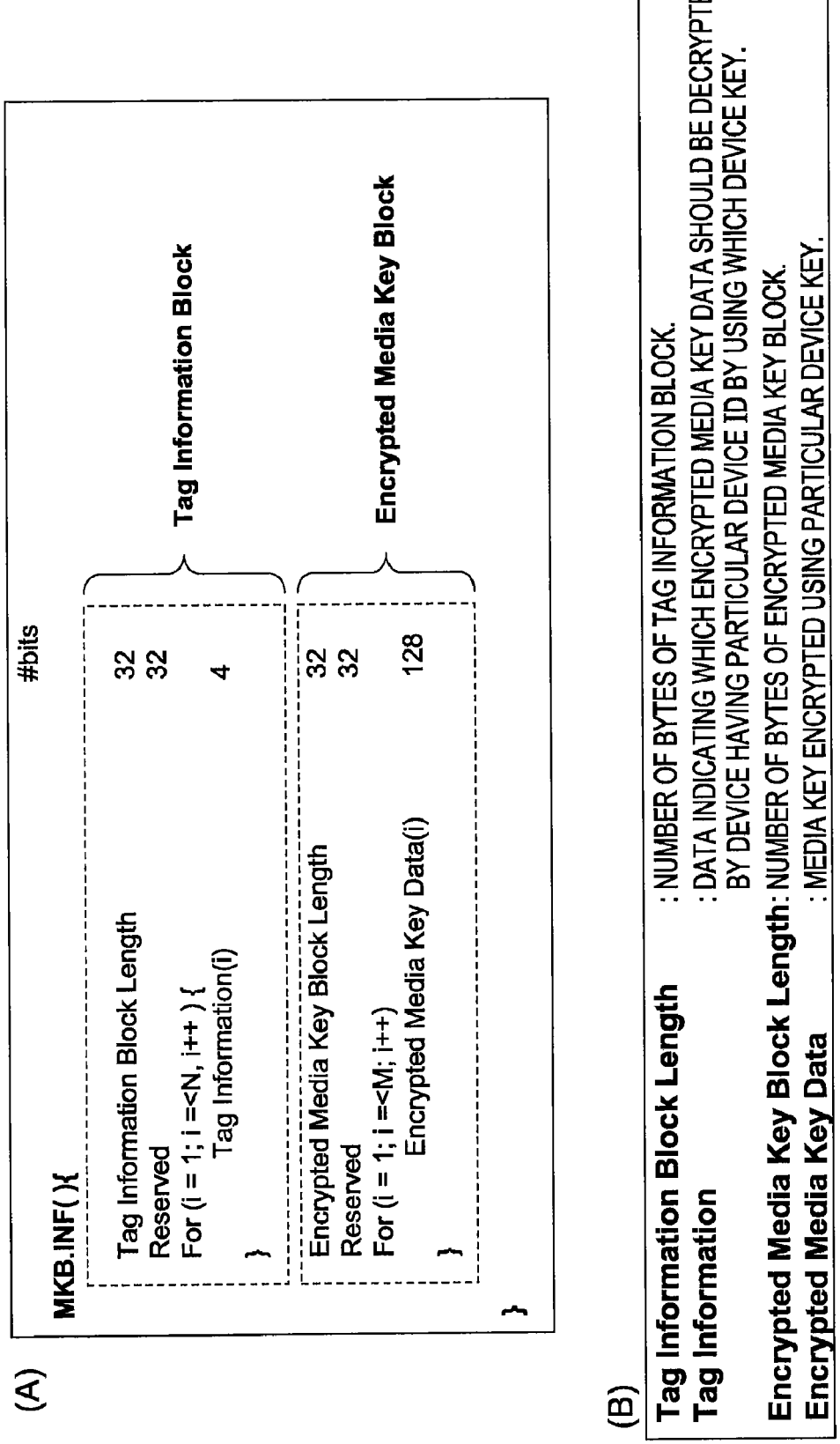
FIG. 29 illustrates the data structure of the medium key block (MKB).

FIG. 29 shows (A) the data structure of a medium key block (MKB), and (B) syntax. The medium key block (MKB) contains the following information.

Tag Information Block Length: the number of bytes of a tag information block

Tag Information: data indicating which encrypted media key data should be decrypted by a device having a particular device ID by using which device key Encrypted Media Key Block Length: the number of bytes of an encrypted media key block Encrypted Media Key Data: a media key encrypted using a particular device Key.

[Encrypted Media Key Data], which is data such that a medium key is encrypted using a device key, is encrypted data in which only the device key stored in the valid device that has not been revoked (nullified) is used, and is encrypted data from which a medium key (Km) cannot be obtained by decryption using the device key of the device that has been revoked (nullified).

as described previously with reference to FIG. 14, the above-described medium key block (MKB) is provided from the management center 310 shown in FIG. 14 to the information recording medium manufacturing entity 350, and is stored on the information recording medium by the information recording medium manufacturing entity 350. As described with reference to FIGS. 15 to 17, the information recording medium manufacturing entity 350 performs a data encryption process and another process for recording stored data in accordance with the disc-image-generating auxiliary information file (MSTBL.DAT), described with reference to FIGS. 16 and 17. Recording forms of the medium key block (MKB) are also described in the disc-image-generating auxiliary information file (MSTBL.DAT) described with reference to FIGS. 16 and 17, and a process for recording onto the information recording medium in accordance with the description of the auxiliary file will be performed.

Figure 14:
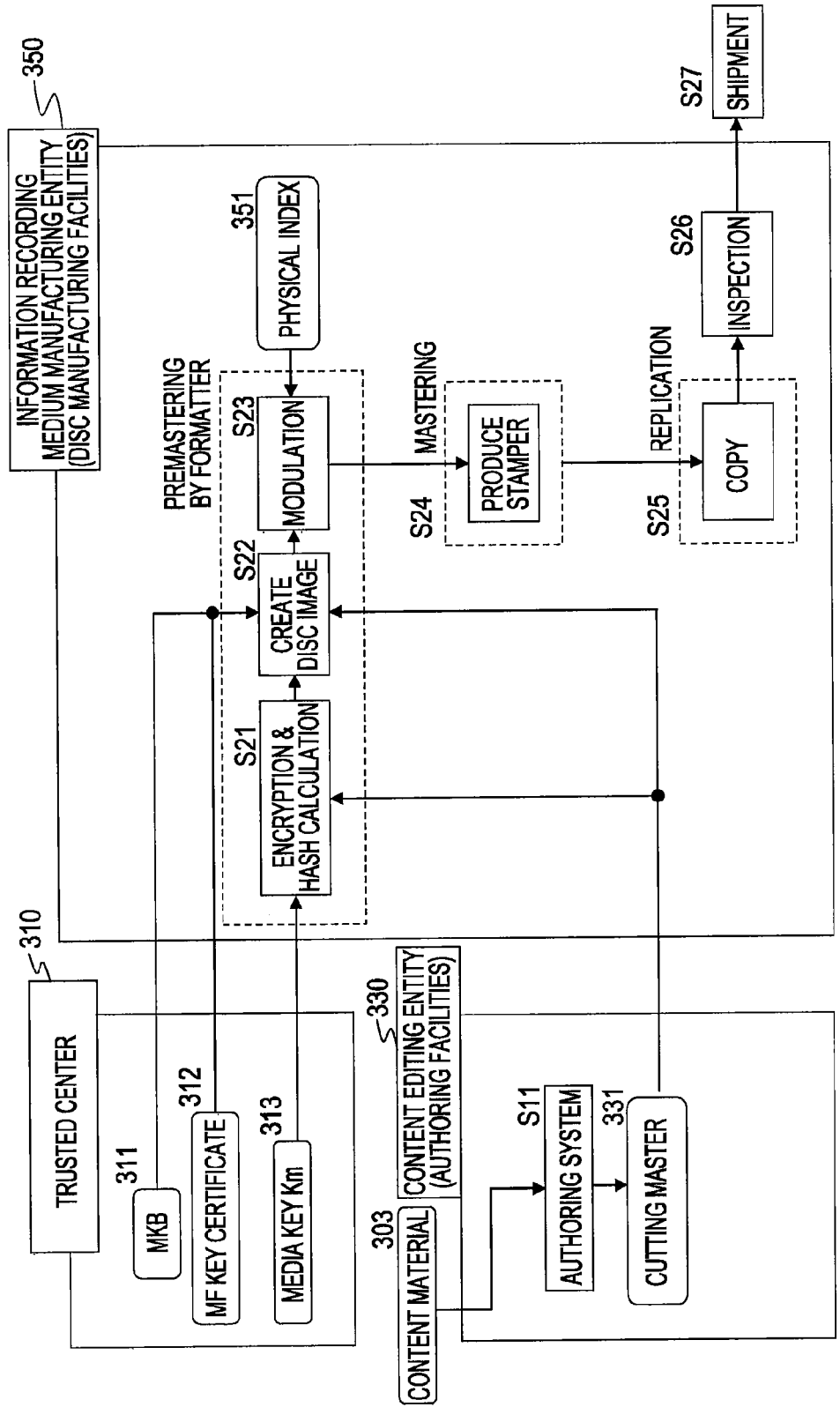
FIG. 14 illustrates examples of processing performed by the management center, the content editing entity, and the information recording medium manufacturing entity.

FIG. 30 shows that the description on the medium key block (MKB) in the disc-image-generating auxiliary information file (MSTBL.DAT) described with reference to FIGS. 16 and 17 is extracted. FIG. 30(A) shows the description on the medium key block (MKB) of the disc-image-generating auxiliary information file (MSTBL.DAT). FIG. 16(B) shows the syntax thereof.

as shown in FIG. 30, in the disc-image-generating auxiliary information file (MSTBL.DAT), the following is recorded as indication information on the recording position of the medium key block (MKB), that is, as MKB position indication information 951:

MKB_Location: the physical sector number at the start point of the MKB. When MKB_Cert is not recorded in the layer, 0000000016 indicating that the MKB is not to be recorded is written.

on the basis of this indication information, the information recording medium manufacturing entity 350 records the medium key block (MKB) received from the management center 310 at the indicated physical sector number.

as described above, the content editing entity 330 shown in FIG. 14 provides the disc-image-generating auxiliary information file (MSTBL.DAT), together with the cutting master 331, to the information recording medium manufacturing entity 350.

the content editing entity 330 generates dummy data, for example, a cutting master in which all 0's is set, at the recording position of the medium key block (MKB), and provides it to the information recording medium manufacturing entity 350. This process will be described with reference to FIG. 31.

FIG. 31(A) shows a cutting master provided from the content editing entity 330 to the information recording medium manufacturing entity 350. FIG. 31(B) shows a disc image created by a disc image creation process (see the flow in FIG. 15) using the disc-image-generating auxiliary information file (MSTBL.DAT) 961 in the information recording medium manufacturing entity 350.

a formatter 963 is a recording data generation apparatus for generating format data as recording data ((B) the disc image) for the information recording medium. On the basis of (A) the cutting master provided from the content editing entity 330 to the information recording medium manufacturing entity 350, the formatter 963 generates format data by referring to the disc-image-generating auxiliary information file (MSTBL.DAT) 961.

the formatter 963 includes an analyzer 964 for analyzing an auxiliary file containing data recording mode information for master data as original data of recording data for the information recording medium, and a data position setter 966 for determining the setting position of specific information of the medium key block (MKB) 967 and the like in accordance with the analysis information of the analyzer 964. The analyzer 963 obtains the setting position information of the specific information contained in the auxiliary file, and the data position setter 966 determines the setting position of the specific information on the basis of the obtained information.

Figure 31:
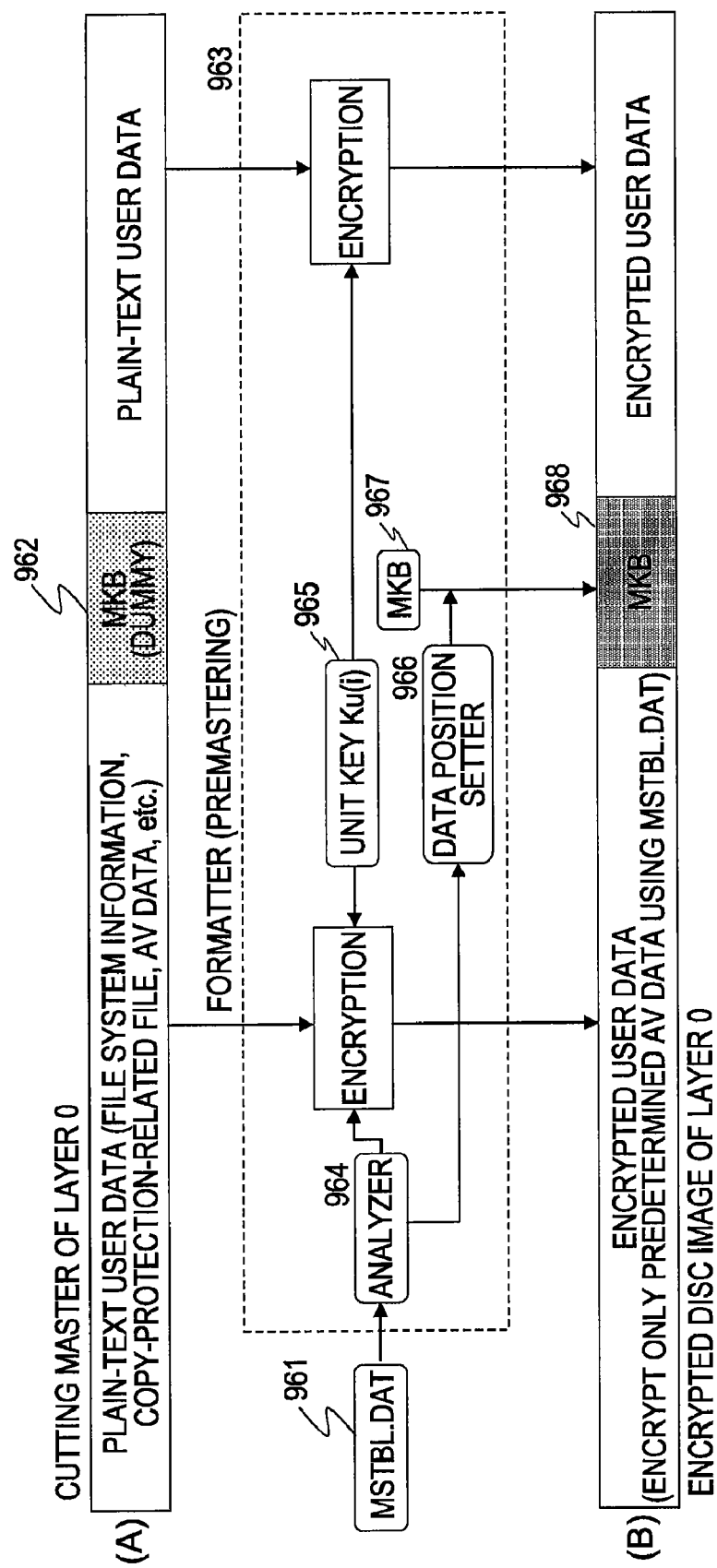
FIG. 31 illustrates a disc image creation process involving recording of a medium key block (MKB), which is performed by an information recording medium manufacturing entity.

Here, an example of processing of one layer (layer 0) is shown. The layer 0 is a layer in which a medium key block (MKB) is recorded. When the information recording medium has a plurality of layers, the medium key block (MKB) may be recorded in only one layer.

in the disc-image-generating auxiliary information file (MSTBL.DAT) 961, it is assumed that [MKB_Location] as indication information on the recording position of the medium key block (MKB), more specifically, the physical sector number at the recording start point of the medium key block (MKB), is specified.

as shown in FIG. 31(A), in the area where the medium key block (MKB) of the cutting master provided from the content editing entity 330 to the information recording medium manufacturing entity 350 is scheduled to be recorded, medium key block (MKB) dummy data 962, for example, all 0's, is recorded. With this processing, the content editing entity 330 does not need to receive the medium key block (MKB) from the management center 310 and can create a cutting master.

the cutting master having the medium key block (MKB) dummy data 962 is provided to the information recording medium manufacturing entity, whereby data encryption and another recording data generation process based on the disc-image-generating auxiliary information file (MSTBL.DAT) 961 are performed. More specifically, as shown in FIG. 31, an encryption process using a unit key 965 for plain-text user data contained in the cutting master shown in part (A), and a process for setting the medium key block (MKB) 967 in a dummy data area are performed.

the medium key block (MKB) 967 is data that is received from the management center by the information recording medium manufacturing entity. The information recording medium manufacturing entity obtains the physical sector number at the recording start point of the medium key block (MKB) from the disc-image-generating auxiliary information file (MSTBL.DAT) 961, and creates a disc image in which the medium key block (MKB) 967 is set at this position, that is, creates a disc image shown in FIG. 31(B). The position of a medium key block (MKB) 968 of the disc image shown in FIG. 31(B) corresponds to the recording area of the medium key block (MKB) dummy data 962 of the cutting master shown in FIG. 31(A).

when the content editing entity creates a cutting master shown in FIG. 31(A), it is necessary to determine the size of the recording area of the medium key block (MKB) dummy data 961. When the content editing entity knows the size of the medium key block (MKB), a process for embedding a dummy value for the amount corresponding to the size is performed. When the content editing entity does not know, information on the size of the medium key block (MKB) is received from the management center, and a dummy value for the amount corresponding to the size is embedded. Alternatively, a process for embedding a dummy value for the amount corresponding to the maximum size of the MKB is performed.

in addition to the medium key block (MKB), the content editing entity may be configured to create a cutting master in which dummy data corresponding to data, such as a content hash table (CHT), a content certificate (Content_Cert), an encrypted unit key (Unit_Key.inf), and a public key certificate (MF Key Certificate) of an information recording medium manufacturing entity, to create a disc-image-generating auxiliary information file (MSTBL.DAT) in which information on recording positions (recording start addresses) of these pieces of data is set, and to provide them to the information recording medium manufacturing entity.

with such settings, in a state in which the content editing entity does not receive specific data, that is, data such as a medium key block (MKB), a content hash table (CHT), a content certificate (Content_Cert), an encrypted unit key (Unit_Key.inf), or a public key certificate (MF Key Certificate) of the information recording medium manufacturing entity, the information recording medium manufacturing entity becomes possible to receive or create these pieces of data and to create a disc image that is set at the position indicated by the disc-image-generating auxiliary information file (MSTBL.DAT). Therefore, an efficient recording data generation process becomes possible. The content editing entity can set the recording position of various kinds of information including the medium key block (MKB) at any position, making it possible to increase the flexibility of data recording.

[8. Example of Configuration of Information Processing Apparatus]

Next, a description will be given, with reference to FIG. 32, of an example of the configuration of an information processing apparatus for recording or reproducing main content and subcontent having the above-described content management units (CPS units).

An information processing apparatus 800 includes a drive 890 for driving an information recording medium 891 and for inputting and outputting a data recording/reproduction signal, a CPU 870 for performing data processing in accordance with various kinds of programs, a ROM 860 serving as an area for storing the programs, parameters, and the like, a memory 880, an input/output I/F 810 for inputting and outputting a digital signal, an input/output I/F 840 for inputting and outputting an analog signal, the input/output I/F 840 having an A/D-D/A converter 841, an MPEG codec 830 for encoding and decoding MPEG data, TS and PS processing means 820 for performing TS (Transport Stream) and PS (Program Stream) processes, and encryption processing means 850 for performing various kinds of encryption processes. Each block is connected to a bus 801.

The operation when data is to be recorded will be described first. Two cases of inputting a digital signal and an analog signal as data to be recorded are considered.

In the case of a digital signal, data, which is input from the input/output I/F 810 for digital signals and on which an appropriate encryption process has been performed as necessary by the encryption processing means 850, is stored on the information recording medium 891. When the data format of the input digital signal is to be converted and stored, the signal is converted into a data format for storage by the MPEG codec 830, the CPU 870, and the TS and PS processing means 820. Thereafter, the encryption processing means 850 performs an appropriate encryption process thereon and stores the signal on the information recording medium 891.

In the case of an analog signal, the analog signal input to the input/output I/F 840 is converted into a digital signal by the A/D converter 841, and the signal is converted into that for a codec used during recording by means of the MPEG codec 830. Thereafter, the signal is converted into AV multiplexed data in a recording data format by the TS and PS processing means 820, and data on which an appropriate encryption process has been performed as necessary by the encryption processing means 850 is stored on the recording medium 891.

For example, when the main content formed of AV stream data composed of MPEG-TS data is to be recorded, the main content is divided into content management units (CPS units). Thereafter, an encryption process using a unit key is performed by the encryption processing means 850, and the content is recorded on the recording medium 891 via the drive 890.

The subcontent is also divided into content management units (CPS units) corresponding to each of data groups. Thereafter, an encryption process using a unit key is performed by the encryption processing means 850, and the content is recorded on the recording medium 891 via the drive 890.

Next, a description will be given of processing when data is to be reproduced from an information recording medium. For example, when AV stream data formed of MPEG-TS data as main content is to be reproduced, data read from the information recording medium 891 in the drive 890 is identified as a content management unit. Thereafter, a process for obtaining a unit key corresponding to the content management unit is performed, and on the basis of the obtained unit key, encryption is decrypted by the encryption processing means 850, and the data is divided into each piece of data, such as video, audio, subtitles, and the like by the TS (Transport Stream) and PS (Program Stream) processing means 820.

The digital data decoded by the MPEG codec 830 is converted into an analog signal by the D/A converter 841 in the input/output I/F 840 and is output. When digital output is to be performed, MPEG-TS data decrypted by the encryption processing means 850 is output as digital data via the input/output IF 810. The output in this case is performed with respect to, for example, a digital interface, such as IEEE 1394, an Ethernet cable, or a wireless LAN. When a network connection function is to be supported, the input/output IF 810 has a network connection function. When, in the reproduction apparatus, data is converted into a format with which the output target device can receive the data and is output, the MPEG codec 830 performs rate conversion and a codec conversion process on video, audio, subtitles, and the like that are temporarily separated by the TS and PS processing means 820, and data multiplexed into an MPEG-TS, an MPEG-PS, or the like again by the TS and PS processing means 820 is output from the digital input/output I/F 810. Alternatively, it is also possible to convert the data into a codec, multiplexed file other than MPEG by using the CPU 870 and to output it from the digital input/output I/F 810.

Also, in the case of subcontent, when the subcontent is identified as a content management unit, a process for obtaining a unit key corresponding to the content management unit is performed. On the basis of the obtained unit key, the encryption processing means 850 decrypts the encryption and performs a reproduction process. Key information for each content management unit (CPS unit), which is necessary when reproduction is to be performed, can be obtained from data held in a memory 880. When the unit key has not been stored on the information recording medium, it can be obtained by performing a predetermined procedure from the network-connected server.

As described above, one unit key is assigned to a content management unit (CPS unit). The reproduction application program for centrally controlling content reproduction detects an occurrence of switching of the content management unit (CPS unit), and switches the key to be used in response to the switching. When a key has not been obtained, a process for displaying a message for prompting obtaining of the key is performed.

In the recording and reproduction apparatus, when necessary information is to be obtained via a network outside the apparatus, the obtained data is stored in the memory 880 in the recording and reproduction apparatus. Data to be stored includes key information necessary for reproducing content, subtitles to be reproduced in synchronization with the content reproduction time, audio information, data such as still images, the operation rule (usage rule) of the reproduction apparatus corresponding to content management information, and the like.

A program for executing the reproduction process and the recording process is stored in the ROM 860. While the program is being executed, the memory 880 is used as an area for storing parameters and data and as a work area as necessary. In FIG. 32, a description has been given by showing the configuration of the apparatus capable of recording and reproducing data. Alternatively, an apparatus having only a reproduction function, and an apparatus having only a recording functions can also be configured. The present invention can be applied to these apparatuses.

In the foregoing, the present invention has been described in detail while referring to specific embodiments. However, it is self-explanatory that a person skilled in the art can make modifications and alterations of the embodiments within the scope and spirit of the present invention. That is, the present invention has been described in the form of examples and should not be construed as being limited. To determine the gist of the present invention, the claims should be taken into consideration.

The series of processes described in the specification can be performed by hardware, software, or the combined configuration of them. When the series of processes is to be performed by software, a program in which a processing sequence is recorded is installed in a memory of a computer that is incorporated in specialized hardware, whereby the program is executed, or a program is installed into a general-purpose computer capable of performing various processes, whereby the program is executed.

For example, a program can be recorded in advance in a hard disk and a ROM (Read Only Memory) serving as recording media. Alternatively, a program can be temporarily or permanently stored (recorded) on a removable recording medium, such as a flexible disk, a CD-ROM (Compact Disc Read Only Memory), an MO (Magneto optical) disc, a DVD (Digital Versatile Disc), a magnetic disc, or a semiconductor memory. Such a removable recording medium can be provided as packaged software.

In addition to being installed into a computer from the above-described removable recording medium, the program may be transferred wirelessly from a download site or may be transferred by wire to the computer via a network, such as a LAN (Local Area Network) or the Internet. It is possible for the computer to receive the program that is transferred in such a manner and to install the program into a recording medium such as a hard disk contained therein.

The various processes described in the specification may be executed not only in chronological order according to the description, and may also be executed in parallel or individually according to the processing performance of the apparatus that performs processing or as necessary. In this specification, the system designates a logical assembly of a plurality of devices. It is not essential that the devices be disposed in the same housing.

INDUSTRIAL APPLICABILITY

As has been described in the foregoing, in the configuration of the present invention, master data as original data of recording data for the information recording medium is generated, recording data for the information recording medium is generated on the basis of the master data, master data containing a dummy data area in a partial area of the master data is generated, and processes for identifying the dummy data area on the basis of the storage information of an auxiliary file and for setting significant information are performed. Therefore, when the master data is to be generated, it is not necessary to obtain the data of the significant information, and it becomes possible to generate master data without obtaining specific information such as an encrypted key block.

according to the configuration of the present invention, medium key block (MKB) dummy data, for example, all 0's, is recorded in an area in which the medium key block (MKB) of the cutting master provided from the content editing entity to the information recording medium manufacturing entity is scheduled to be recorded, and the cutting master is provided to the information recording medium manufacturing entity. In the information recording medium manufacturing entity, a disc image in which the medium key block (MKB) is set can be created in accordance with the position indicated by the disc-image-generating auxiliary information file (MSTBL.DAT). In a state in which the content editing entity does not receive specific data, that is, data such as a medium key block (MKB), a content hash table (CHT), a content certificate (Content_Cert), an encrypted unit key (Unit_Key.inf), or a public key certificate (MF Key Certificate) of the information recording medium manufacturing entity, the information recording medium manufacturing entity becomes possible to receive or generate these pieces of data and to create a disc image that is set at the position indicated by the disc-image-generating auxiliary information file (MSTBL.DAT). Therefore, an efficient recording data generation process becomes possible. The content editing entity can set the recording position of various kinds of information including the medium key block (MKB) at any position, making it possible to increase the flexibility of data recording.

It should be understood that various changes and modifications to the presently preferred embodiments described herein will be apparent to those skilled in the art. Such changes and modifications can be made without departing from the spirit and scope of the present application and without diminishing its intended advantages. It is therefore intended that such changes and modifications be covered by the appended claims.

The invention claimed is:

1. An information recording medium manufacturing management system comprising:
a management center for providing management information for content use management; a content editing entity for performing a content editing process; and an information recording medium manufacturing entity for receiving edited content from the content editing entity and for recording content on an information recording medium,
wherein the content editing entity is configured to generate master data as original data of recording data for the information recording medium as master data containing a dummy data area in a partial area of the master data and provide the master data to the information recording medium manufacturing entity, and the information recording medium manufacturing entity is configured to generate recording data for the information recording medium on the basis of the master data containing the dummy data area and perform a process for setting information received from a management center or generated information in the dummy data area in order to generate recording data.

2. The information recording medium manufacturing management system according to claim 1,
wherein the content editing entity is configured to create an auxiliary file containing position information of the dummy data area and provide the auxiliary file to the information recording medium manufacturing entity, and
the information recording medium manufacturing entity is configured to identify the dummy data area on the basis of the position information of the auxiliary file and perform a process for setting information received from the management center or generated information in the dummy data area.

3. The information recording medium manufacturing management system according to claim 1,
wherein the information recording medium manufacturing entity is configured to perform a process for using an encrypted key block structured so that significant information can be obtained by only a device having a valid license as information to be set in the dummy data area.

4. The information recording medium manufacturing management system according to claim 1,
wherein the information recording medium manufacturing entity is configured to perform a process for using at least one of a content hash table (CHT) in which hash values based on content to be stored on the information recording medium are stored, a content certificate (Content_Cert) for verifying the authenticity of content, key information used to encrypt content, and a public key certificate (MF Key Certificate) of the information recording medium manufacturing entity as information to be set in the dummy data area.

5. A recording data generation apparatus for generating format data as recording data for an information recording medium, the recording data generation apparatus comprising:
an analyzer configured to analyze an auxiliary file containing data recording mode information for master data as original data of recording data for the information recording medium; and
a data position setter configured to determine the position at which specific information is set in accordance with analysis information of the analyzer,
wherein the analyzer is configured to obtain dummy data setting position information as the setting position information of the specific information contained in the auxiliary file, and the data position setter is configured to determine the position at which the specific information is set in accordance with the obtained information.

6. The recording data generation apparatus according to claim 5, further comprising an encryptor,
wherein the analyzer analyzes the necessity/unnecessity of encryption for each sector and an encryption mode on the basis of the auxiliary file, and
the encryptor performs an encryption process in accordance with the analysis information and generates recording data in units of sectors.

7. A recording data generation method for generating format data as recording data for an information recording medium, the recording data generation method comprising:
an analysis step of analyzing an auxiliary file containing data recording mode information for master data as original data of recording data for the information recording medium and obtaining the setting position information of specific information contained in the auxiliary file; and
a data position setting step of setting a specific information position in the recording data in accordance with the setting position information of the specific information obtained in the analysis step.

8. The recording data generation method according to claim 7, further comprising an encryption step,
wherein the analysis step analyzes the necessity/unnecessity of encryption for each sector and an encryption mode on the basis of the auxiliary file, and
the encryption step performs an encryption process in accordance with the analysis information and generates recording data in units of sectors.

9. A computer readable storage medium storing a computer readable program for enabling apparatus to generate format data as recording data for an information recording medium, the computer readable program structured to cause the apparatus to:
analyze an auxiliary file containing data recording mode information for master data as original data of recording data for the information recording medium and obtaining setting position information of specific information contained in the auxiliary file; and
set a specific information position in the recording data in accordance with the obtained setting position information of the specific information.

* * * * *